(12) United States Patent
O'Neil

(10) Patent No.: US 6,226,364 B1
(45) Date of Patent: *May 1, 2001

(54) METHOD AND SYSTEM FOR PROVIDING PREPAID AND CREDIT-LIMITED TELEPHONE SERVICES

(75) Inventor: Douglas R. O'Neil, Evans, GA (US)

(73) Assignee: Bellsouth Intellectual Property Management Corporation, Atlanta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/986,973

(22) Filed: Dec. 8, 1997

(51) Int. Cl.[7] .................................................. H04M 15/00
(52) U.S. Cl. .......................... 379/112; 379/114; 379/144; 379/121
(58) Field of Search .................... 379/111–114, 144–145, 379/115, 20, 127, 121, 126, 133–134, 188–189, 196–197, 199–200

(56) References Cited

U.S. PATENT DOCUMENTS

| | | | |
|---|---|---|---|
| 5,291,543 | | 3/1994 | Freese et al. . |
| 5,440,621 | * | 8/1995 | Castro ................................. 379/112 |
| 5,450,477 | * | 9/1995 | Amarant et al. ................. 379/91.02 |
| 5,469,497 | * | 11/1995 | Pierce et al. ........................ 379/115 |
| 5,706,338 | * | 1/1998 | Relyea et al. ....................... 379/189 |
| 5,721,768 | * | 2/1998 | Stimson et al. ..................... 379/144 |
| 5,749,075 | * | 5/1998 | Toader et al. ......................... 705/14 |
| 5,825,863 | * | 10/1998 | Walker ............................... 379/114 |

FOREIGN PATENT DOCUMENTS

| | | |
|---|---|---|
| 0540234 | 5/1993 | (EP) . |
| 0809387 | 5/1997 | (EP) . |
| 2171877 | 9/1986 | (GB) . |
| 9520298 | 7/1995 | (WO) . |
| 9615633 | 5/1996 | (WO) . |
| 9534161 | 12/1996 | (WO) . |

\* cited by examiner

*Primary Examiner*—Duc Nguyen
(74) *Attorney, Agent, or Firm*—Kilpatrick Stockton LLP

(57) ABSTRACT

A real-time telephone call monitoring, rating, and response system including real-time interfaces and switching centers that create and maintain in-process call detail records for on-going telephone calls. The real-time interfaces are accessed by a real-time monitoring unit in a billing system. The billing system maintains accounts and associated service profiles for subscribers. The billing system may also obtain temporary service profiles for roamers. For both subscribers and roamers, the billing system monitors the in-process call detail records in real time and instructs the switching centers to take certain actions, such as obtaining an alternate payment source, or disconnecting a communication, in response to financial considerations determined by the billing system. A prepaid telephone service card system, including a prepaid telephone service database located in the billing system, operates in connection with the real-time telephone call monitoring, rating, and response system. A holder of a prepaid telephone service card accesses a predaid telephone service card activation unit and enters the serial number printed on a card along with a directory number associated with a particular account maintained in the billing system. The billing system then credits the particular account with the value of the card and, during subsequent telephone calls incurring a charge to the account, charges the cost of the telephone service against the prepaid balance in the account.

25 Claims, 7 Drawing Sheets

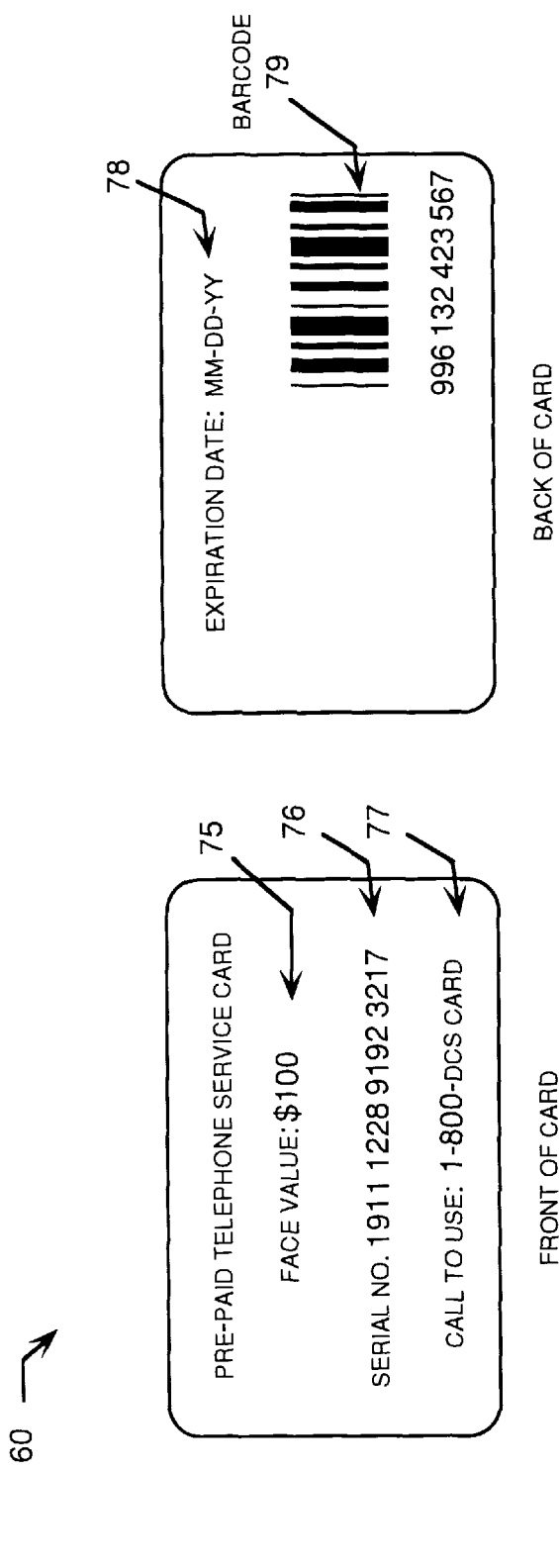

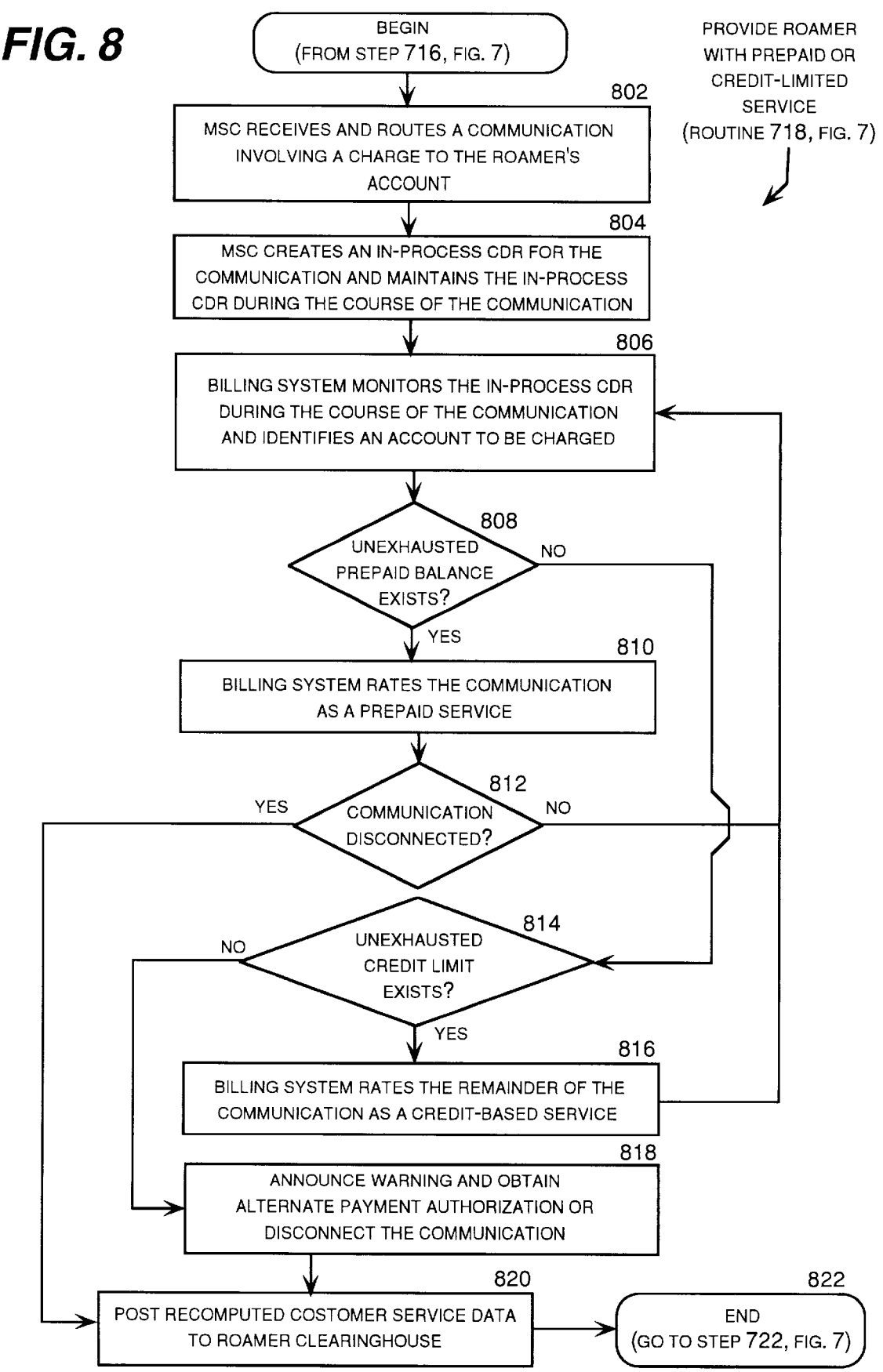

METHOD AND SYSTEM FOR PROVIDING PREPAID AND CREDIT-LIMITED TELEPHONE SERVICES

TECHNICAL FIELD

The present invention relates generally to telecommunications systems, and more particularly, relates to a method and system for providing prepaid and credit-limited cellular telephone services.

BACKGROUND OF THE INVENTION

The charges for traditional telephone services are postpaid, which means that the charges are billed after the telephone services have been provided. In other words, the familiar telephone bill that arrives each month includes charges for the previous month's telephone use. Telephone service providers, many of which serve millions of subscribers, therefore accrue enormous accounts receivable. Carrying such large accounts receivable incurs finance changes and reduces the company's liquidity. In addition, some portion of each month's accounts receivable go unpaid, as some subscribers default on their payments. Telephone service providers therefore have a financial motivation to encourage their subscribers to prepay for telephone service.

Other costly problems arise from the traditional telephone service policy of providing each subscriber in good standing with virtually unlimited credit for using telephone services. This means that at any time, any active subscriber account may be billed a virtually unlimited amount for using telephone services. Eventually, after a subscriber's account has been in arrears for several months, the subscriber's telephone service may be deactivated until the outstanding balance is paid. This unlimited credit policy may encourage undisciplined subscribers to incur imprudently large telephone bills. Worse yet, unlimited credit facilitates very large fraudulent telephone charges to subscriber accounts. To reduce the occurrence of unpaid and fraudulent telephone charges, telephone service providers are financially motivated to limit the amount of credit provided to subscribers.

Accordingly, many long distance and cellular telephone service providers have begun selling prepaid telephone service cards. These cards have a prepaid face value that may be redeemed by using telephone services provided by the issuer of the card. To encourage subscribers to use the prepaid cards, prepaid telephone service is often provided at a discount with respect to traditional postpaid service. Prepaid telephone service cards can also be used to increase sales and boost profits by providing new ways to package and sell telephone service. In particular, prepaid telephone service cards may be used as gifts and promotional items.

To support a prepaid telephone service card system, the telephone service provider must have a way to limit the value of the telephone service provided as a result of the use of the card to the value in the corresponding prepaid account. Of course, the balance in a prepaid account diminishes as telephone services are used. Eventually, the entire value of the prepaid account is exhausted. In the simple case, the prepaid account becomes exhausted between uses of telephone services, for example by cash redemption of the remaining balance. In this case, the telephone service provider simply does not honor the card after the value has been exhausted.

In the more challenging case, a prepaid account balance becomes exhausted while telephone service is being provided, for example in the middle of a cellular or long distance telephone call. Consider a card holder that uses a telephone prepaid card as a method of payment to initiate a cellular or long distance call. The telephone service provider honors the card because the corresponding account has a minimum threshold value. The card holder, however, may conduct very long telephone call, the cost of which far exceeds the prepaid account balance. The telephone service provider therefore needs a way to monitor the balance of the prepaid account while the telephone call is in progress and to disconnect the telephone call when the prepaid account balance is exhausted. Otherwise, a caller using a telephone prepaid card would effectively receive free telephone service after exhaustion of the prepaid account balance.

An inability to disconnect telephone services initiated with a prepaid telephone service card would expose the telephone service provider to a loss of revenue through the provision of some free service with each prepaid card. An unscrupulous person learning of this loophole could initiate a telephone call using a prepaid card with a small account balance and then maintain the connection for a virtually unlimited time. Distribution of a large number of telephone prepaid cards could therefore result in the provision of a large, unknown, and unknowable amount of free telephone service. In the extreme case, a large number of free telephone service could consume the available capacity in the telephone service provider's system, causing the provider further damage as subsequent would-be paying subscribers find the circuits busy. An inability to disconnect a telephone call initiated with a telephone prepaid card would therefore effectively prohibit a telephone service provider from offering telephone prepaid cards.

Long distance telephone service providers have therefore developed prepaid long distance telephone card systems with the ability to disconnect telephone calls initiated with telephone prepaid service cards. This type of system typically relies on an intelligent telephone service handling platform that a card holder accesses by dialing a special directory, such as a toll-free "800" directory number printed on the prepaid telephone service card. A voice channel communication (i.e., a communication using a voice channel or "trunk circuit") is then routed from the originating station to the intelligent platform, and then from the intelligent platform to the called station. The intelligent platform remains in the circuit to monitor the duration of the telephone call and to disconnect the telephone call, if necessary.

Like long distance telephone service providers, cellular telephone service providers also experience costly problems with postpaid accounts. Fraud by criminals who intercept the overhead data communications of cellular mobile radiotelephones and then use the purloined information to obtain cellular roaming service is a particularly costly crime. As a result, cellular telephone service providers have begun to issue prepaid cellular telephone service cards.

Prepaid cellular telephone service cards provide the card issuers with a number of advantages. For example, a prepaid telephone service card may be packaged for sale with a new cellular telephone to encourage the purchaser to select the issuer of the card as the purchaser's cellular telephone service provider. Alternatively, a goods or service provider could purchase a large number of prepaid telephone service cards having relatively small account balances and have the cards imprinted with advertising material for distribution to potential subscribers, such as patrons at a convention. There are many other potentially desirable uses for prepaid telephone service cards. A teenager away from home, for instance, could be given a prepaid telephone service card having a telephone service allowance with a fixed value.

Similarly, a hotel or resort guest could be issued a cellular telephone with a prepaid account balance for use while staying at the hotel or resort as a guest.

Because conventional cellular switching equipment is not configured to rate telephone calls in real-time, a prepaid cellular telephone call is routed thorough a special voice-channel-connected intelligent platform that is configured to monitor, rate, and disconnect the telephone call, if necessary. In many cases, this has led cellular telephone service providers to set aside one or more groups of telephone numbers having a common prefix ("NPA-NXX") for prepaid accounts. A voice channel communication originating from or directed to a cellular telephone assigned one of these directory numbers is routed through an intelligent platform configured to implement the prepaid service. The intelligent platform remains in the circuit to monitor the duration of the telephone call and to disconnect the telephone call, if necessary. This approach consumes large blocks of directory numbers for prepaid accounts and does not allow a subscriber to use the same cellular telephone to place postpaid as well as prepaid telephone calls, which reduces the usefulness of the prepaid cellular telephone service cards as promotional items and gifts.

Conventional prepaid telephone service systems rely on two voice channel switching platforms, an originating switch and an intelligent platform configured to implement the prepaid service, to handle the originating end of a prepaid telephone call. A conventional postpaid telephone call, on the other hand, only requires one voice channel switching platform, the originating switch, to handle the originating end of a postpaid telephone call. Therefore, using the conventional prepaid systems to make prepaid and credit-limited telephone service generally available to cellular subscribers would virtually double the number of voice channel switching platforms required to originate telephone calls in the system. For this reason, the conventional prepaid systems may not be economically feasible alternatives for making prepaid telephone service generally available to cellular subscribers.

In addition, the conventional prepaid systems rely on "double-trunked" voice channel telephone circuits to complete many prepaid telephone calls. For example, in a typical cellular telephone system, a single intelligent platform, or a redundant pair of intelligent platforms in the same location, may implement a prepaid telephone service card system. To illustrate a "double-trunked" voice channel telephone circuit, consider a cellular system in which the intelligent platform is located in Atlanta. A telephone call originating in a cell served by a switch in Macon, and placed to a called party in Macon, will therefore be routed through the intelligent platform in Atlanta. Thus, a double-trunked voice channel circuit, Macon-to-Atlanta-to-Macon, is required to complete the prepaid telephone call. This type of double-trunked voice channel telephone circuit inefficiently loads the long distance voice channel trunks.

Moreover, many cellular telephone service customers subscribe to advanced telephone services, such as voice mail, call forwarding, conference calling, and so forth. These advanced services typically require a telephone call involving the advanced services to be routed through an intelligent telephone service platform that implements the advanced services. These advanced-service telephone calls therefore involve a double-trunked voice channel telephone circuit to the intelligent telephone service platform. Because a prepaid telephone call is typically routed through a different intelligent platform, an additional double-trunked voice channel telephone circuit would be required to connect a prepaid telephone call having the advanced services. Due to the inefficiency of this type of communication routing, a subscriber's advanced services may simply not be unavailable for prepaid telephone calls in conventional telecommunications systems.

An unfortunate consequence of the unavailability of advanced services for prepaid cellular telephone calls is that many of a telephone service supplier's preferred customers, those that subscribe to advanced services and use them extensively, are discouraged from using prepaid telephone services. As a result, prepaid and credit-limited services are not generally available to cellular subscribers, and there is no convenient way to provide subscribers of advanced services with effective incentives to prepay for their telephone service. In addition, there is no convenient way to limit the credit extended to these subscribers for using telephone services in a effort to minimize unpaid accounts and to prevent fraudulent charges to their accounts.

Thus, there is a need for an improved method an system for making prepaid and credit-limited telephone service generally available to cellular telephone service subscribers. Specifically, there is a need for a prepaid and credit-limited telephone service system that does not rely on special voice-channel-connected intelligent telephone call handling platforms. There is a further need to provide cellular telephone services in a manner that encourages cellular telephone service customers that subscribe to advanced services to prepay for telephone service and to limit the amount of credit that they are extended for using telephone services.

SUMMARY OF THE INVENTION

The present invention meets the needs described above by providing a method and system for making prepaid and credit-limited telephone service generally available to cellular telephone service subscribers. These services are implemented without having to route a prepaid or credit-limited telephone call through a special voice-channel-connected intelligent telephone call handling platform that is configured to monitor and disconnect the telephone call, if necessary. Double-trunked circuits are therefore not required to implement prepaid and credit-limited telephone service, and multiply-double-trunked circuits are not required to apply advanced services to prepaid and credit-limited telephone calls. As a result, cellular telephone service subscribers in general, including those that subscribe to advanced services, may be effectively encouraged to prepay for telephone service and to limit the amount of credit that they are extended for using telephone services.

The invention helps prevent fraud by providing telephone service suppliers with the ability to require real-time user verification before providing telephone services, particularly to roamers. The invention also helps prevent fraud by allowing a telephone service supplier to limit the amount of credit provided to each account. This allows the telephone service provider to detect and disconnect fraudulent telephone calls before very large fraudulent charges are posted to a subscriber's account. Alternatively, the telephone service provider may obtain an alternate payment source, such a credit or debit bank account, to be charged when the balance in an account exceeds an established credit limit. A temporary customer service profile, which may be used while providing telephone service to a roamer, may be obtained from a roamer clearinghouse. This allows prepaid and credit-limited telephone service to be provided to roamers as well as home-system subscribers.

Generally, a first aspect of the invention is a method for providing prepaid telephone services. A subscriber account is established and a monetary deposit establishes a prepaid balance in the account. A customer service profile is established including prepaid rating parameters and postpaid rating parameters for the account. A communication that incurs a charge to the account is subsequently connected between an originating station and a terminating station. During the course of the communication, the duration of the communication is monitored and a cost associated with a prepaid portion of the communication is charged against the prepaid balance based on the prepaid rating parameters in the customer service profile. In response a determination that the prepaid balance is exhausted, a cost associated with the remainder of the communication is charged to the account based on the postpaid rating parameters.

In particular, the communication may be connected through a switching center, and the subscriber account may be maintained in a billing system. During the course of the communication, the switching center creates and maintains an in-process call detail record for the communication. The switching center also exposes a real-time interface, which is operable for monitoring the in-process call detail record for the communication. The billing system accesses the real-time interface to monitor the in-process call detail record for the communication.

The step of receiving the monetary deposit establishing the prepaid balance in the account may include specifying serial numbers and face value amounts for a batch of prepaid telephone service cards and distributing the batch of prepaid telephone service cards among a group of retail distribution points. The serial numbers and face value amounts for the batch of prepaid telephone service cards are then entered into a prepaid telephone service database within the billing system. A prepaid deposit communication is later received indicating a directory number associated with the subscriber account and the serial number specified for a particular prepaid telephone service card. In response, the subscriber account is credited with the value associated with the particular prepaid telephone service card.

A second aspect of the invention is a method for providing credit-limited telephone services. A subscriber account is established for maintaining a postpaid balance. A subscriber service profile including a credit limit is established for the account. A communication is subsequently connected between an originating station and a terminating station, thereby incurring charges to the account. During the course of the communication, the duration of the communication is monitored and a cost associated with the communication is added to the postpaid balance in the account. In response to a determination that the postpaid balance in the account exceeds the credit limit, a predefined action is taken.

For example, the communication may be disconnected or the rating parameters used to compute a cost associated with continuing the communication may be modified based on the balance in the account. Alternatively, an announcement may be played to the originating station or to the terminating station indicating that the credit limit has been exceeded. In response, an alternate payment source, such as a credit or debit bank account, may be received for continuing the communication, and the cost associated with continuing the communication may be charged to the alternate payment source.

The invention also provides a real-time telephone call monitoring, rating, and response system for providing prepaid and credit-limited telecommunication services. The system includes a switching center having switching equipment for connecting a voice and/or data channel communication circuit between an originating station and a termination station for conducting a communication involving a charge to an account. The switching center includes a call detail record processor coupled to the switching equipment for creating and maintaining an in-process call detail record for the communication during the course of the communication. The switching center also includes a real-time interface coupled to the call detail record processor for monitoring the in-process call detail record during the course of the communication.

The real-time telephone call monitoring, rating, and response system further includes a billing system having a customer service profile database for maintaining a customer service profile for the account. The customer service profile includes prepaid rating parameters and postpaid rating parameters for the account. The billing system includes a real-time monitoring unit for monitoring the in-process call detail record corresponding to the communication. The billing system also includes a real-time processor coupled to the customer service profile database and the real-time monitoring unit. During the course of the communication, the billing system charges the account for a cost associated with a prepaid portion of the communication based on the prepaid rating parameters and the prepaid balance in the account. The billing system also detects the exhaustion of the prepaid balance in the account, and in response, charges the account for a cost associated with the remainder of the communication based on the postpaid rating parameters.

According to another aspect of the invention, the customer service profile further includes a credit limit and the switching center further includes a command processor coupled to the switching equipment. The command processor receives a disconnection command from the billing system. The disconnection command is based on the in-process call detail record, which is monitored by the billing system during the course of the communication. In response to the disconnection command, the command processor causes the switching equipment to disconnect the communication. Accordingly, the real-time processor of the billing system is further operable for computing a postpaid balance for the account during the course of the communication and determining whether the postpaid balance in the account is equal to or exceeds the credit limit. The billing system also includes a command generator functionally connected to the real-time processor for generating the disconnection command in response to a determination by the real-time processor that the postpaid balance in the account is equal to or exceeds the credit limit.

Alternatively, the command processor may be operable for receiving an alternate payment command from the billing system based on the in-process call detail record monitored by the billing system during the course of the communication. The alternate payment command causes the switching equipment to connect the originating station or the termination station to a service node configured for accepting alternate payment information.

According to yet another aspect of the invention, the real-time telephone call monitoring, rating, and response system works in connection with a prepaid telephone card system including a prepaid telephone service card activation unit, such as a dial-in voice response unit or an Internet station for receiving prepaid telephone service information. This information typically includes a directory number associated with the account and a serial number associated with a particular prepaid telephone service card. The prepaid telephone card system also includes a prepaid telephone service database coupled to the prepaid telephone service card activation unit. The prepaid telephone service database maintains prepaid telephone service information, receives the directory number associated with the account and the serial number associated with the particular prepaid telephone service card from the prepaid telephone service card activation unit, and credits the account with a value associated with the particular prepaid telephone service card.

The prepaid telephone card system also includes a prepaid telephone service card distribution center coupled to the prepaid telephone service database for entering prepaid telephone service card information associated with a batch of telephone service cards into the prepaid telephone service database. The prepaid telephone service card distribution center then distributes the batch of prepaid telephone service card among a plurality of retail distribution points.

Thus, it is an object of the invention to provide a method and system for making prepaid and credit-limited telephone service generally available to cellular telephone service subscribers. Specifically, it is an object of the invention to provide a prepaid and credit-limited telephone service system that does not rely on special voice-channel-connected intelligent telephone call handling platforms. It is a further object of the invention to provide cellular telephone services in a manner that encourages cellular telephone service customers that subscribe to advanced services to prepay for telephone service and to limit the amount of credit that they are extended for using telephone services.

That the present invention and the preferred embodiments thereof improve over the drawbacks set forth above and accomplish the objects of the invention set forth herein will become apparent from the detailed description of the preferred embodiment to follow.

BRIEF DESCRIPTION OF THE DRAWINGS

FIG. 2 is a illustration of a prepaid telephone card for use in connection with the prepaid telephone card system of FIG. 1.

FIG. 3 is an illustration of an entry in a prepaid telephone service database in the prepaid telephone card system of FIG. 1.

FIG. 8 is a logic flow diagram illustrating a method for providing a roamer with prepaid or credit-limited telephone services.

DETAILED DESCRIPTION OF EXEMPLARY EMBODIMENTS

Figure 1:
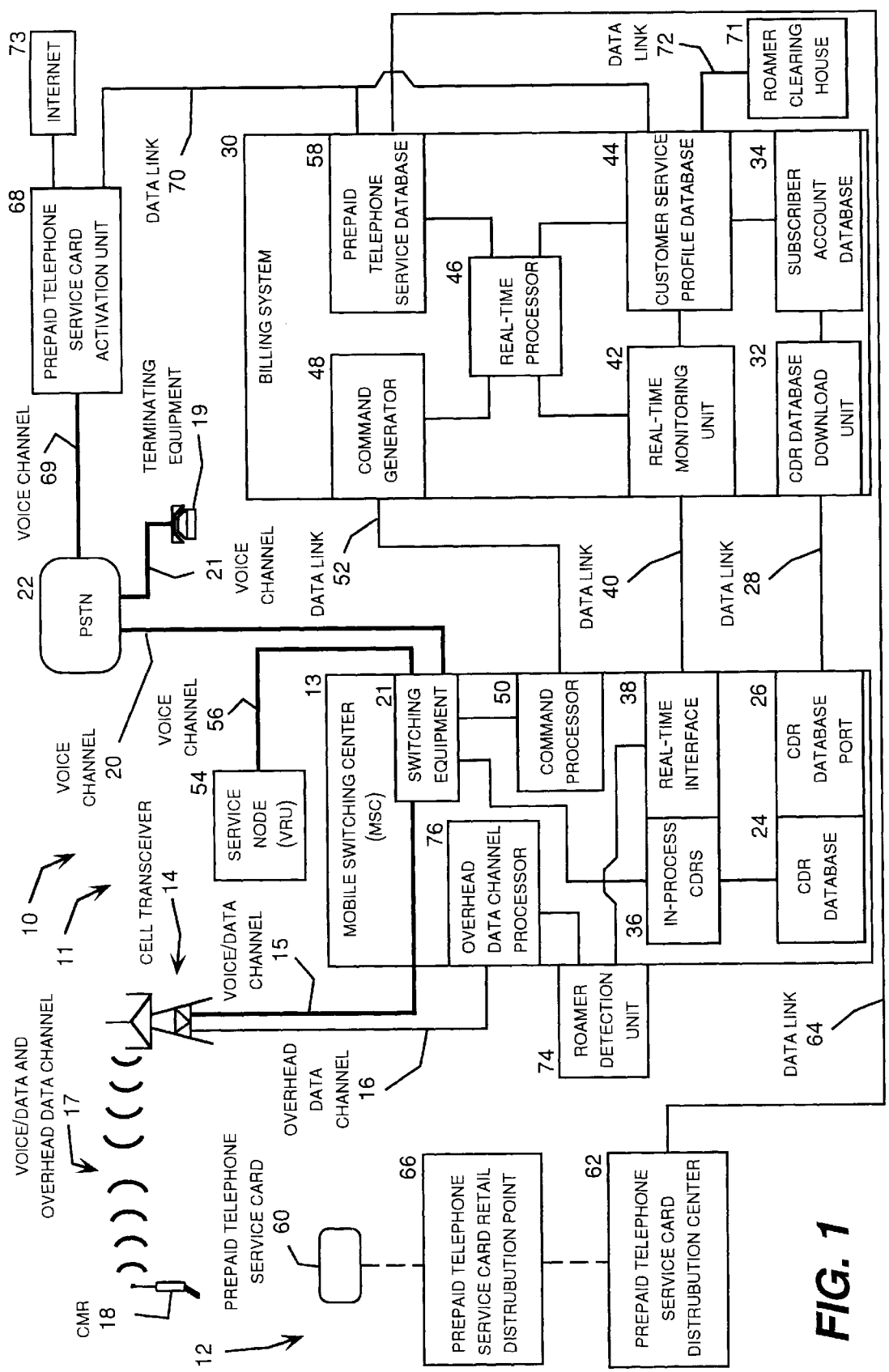
FIG. 1 is a functional block diagram of an illustrative portion of a telecommunications system including a real-time telephone call monitoring, rating, and response system with an associated prepaid telephone card system.

Certain aspects of the present invention are preferably embodied in a real-time telephone call monitoring, rating, and response system. This system includes telecommunications switching centers, which create and maintain call detail records for telephone calls connected through the switching centers. These switching centers include real-time interfaces that are accessed by a real-time monitoring unit in a billing system. The billing system maintains accounts and associated service profiles for the subscribers of the host telephone service provider. The billing system may also obtain temporary customer service profiles for roamers visiting the service territory of the host telephone service provider. For both home-system subscribers and roamers, the real-time interface between the billing system and the switching centers allows the billing system to monitor the in-process call detail records in real time and take certain actions, such as imposing a rate change, obtaining an alternate payment source, or disconnecting a communication in response to financial considerations determined by the billing system. The real-time telephone call monitoring, rating, and response system thus makes prepaid and credit-limited telephone service generally available to cellular telephone service subscribers.

Other aspects of invention are preferably embodied in a prepaid telephone card system that operates in connection with the real-time telephone call monitoring, rating, and response system. The prepaid telephone card system includes a prepaid telephone service database located in the billing system. A batch of prepaid telephone service cards is ordered and, once manufactured, delivered to a prepaid telephone service card distribution center. An operator or automatic card reader at the distribution center enters the serial numbers and face values for the cards into the prepaid telephone service database. The distribution center then distributes the cards to retail distribution points, which sell or give the cards to their customers. A holder of a prepaid telephone service card accesses a prepaid telephone service card activation unit, typically by placing a telephone call to a dial-in voice response unit or accessing the activation unit over the Internet. After accessing the prepaid telephone service card activation unit, the card holder enters the serial number printed on a card along with a directory number associated with a particular account maintained in the billing system. The billing system then credits the particular account with the value of the card and, during subsequent telephone calls incurring a charge to the account, charges the cost of the telephone service against the prepaid balance in the account until the prepaid balance is exhausted.

The invention thus implements a prepaid telephone service card system that does not rely on a special voice-channel-connected intelligent telephone call handling platform. In other words, the cost of a telephone call may be charged against a prepaid balance without having to connect a voice channel circuit for the telephone call through a special prepaid telephone call handling platform. Thus, double-trunked circuits are not required to connect the prepaid telephone call. Furthermore, a prepaid telephone call may be routed through an advanced services telephone call handling platform, just as a conventional postpaid telephone call may be, but without having to connect multiply-double-trunked voice channel circuits. The prepaid telephone service card system may therefore be effectively used to encourage telephone service customers that subscribe to advanced services to prepay for telephone service.

The real-time telephone call monitoring, rating, and response system also enables credit-based rating of telephone services, such as discounted rates for prepaid telephone calls, to encourage subscribers to prepay for telephone service. The rating parameters used to compute the cost of a telephone call may be changed during the course of the telephone call. For example, the billing system may apply discounted prepaid rating parameters to a telephone call so long as a prepaid balance exists in an account, and then apply higher postpaid rating parameters for the remaining duration of the telephone call. The rating parameters may also be varied during the course of a telephone call in response to other financial considerations, such as the size and age of the postpaid balance in the account.

The invention also enables fraud-prevention by providing the telephone service supplier with the ability to limit the amount of credit provided to each subscriber's account. For example, the telephone service provider may limit the telephone charges that may be charged to an account to a fixed amount, such as twice the average monthly bill for the account. In this manner, the telephone service provider can detect telephone calls incurring unusually large charges and take fraud-prevention steps in response. Specifically, the telephone service provider may interrupt an unusually expensive telephone call and request one or both parties to enter verification identification, such as a personal identification number maintained in the subscriber's customer service profile. If one or both the parties to the telephone call cannot verify their identity, the telephone service provider may disconnect the telephone call before very large fraudulent charges are posted to a subscriber's account. Alternatively, if a party does verify its identity but has exceeded the credit-limit maintained in the subscriber's customer service profile, the telephone service provider may obtain an alternate payment source, such a credit or debit bank account, to continue the telephone call.

As noted earlier, a card holder may deposit the value of a prepaid telephone service card in a subscriber's account by inputting appropriate validation information into a prepaid telephone service card activation unit, such as a dial-in voice response unit or an Internet station. In a similar fashion, a subscriber who requires additional credit for a period of time may increase the credit limit for an account by accessing a dial-in voice response unit or an Internet station and providing appropriate verification information, such as a personal identification number. The subscriber may also use the dial-in voice response unit or Internet station to authorize an alternate payment source, such as a credit or debit bank account, to pay costs associated with future or past telephone services.

In addition, customer service information for each account, such as a credit limit, prepaid balance, alternate payment source, outstanding postpaid balance, personal identification number, and authorization procedure may be posted in a roamer clearinghouse so that other telephone service providers can obtain this information for roamers requesting telephone service. The real-time interface monitors a roamer detection unit, which in turn monitors the overhead data channels processed by the switching center. This allows the billing system to detect roamer registration requests. In response to detecting a roamer registration request, the billing system downloads the customer service information for the roamer from the roamer clearinghouse. The roamer's customer service information is then entered into the host billing system as a temporary customer service profile and account for the roamer.

To further prevent fraud, the roamer clearinghouse may detect and prevent a roamer from registering for service in two locations simultaneously. The roamer clearinghouse may also require verification upon detection of an unusual registration pattern, such as a registration pattern that is inconsistent with a roamer's prior registration pattern or involves an impossible or unlikely geographic leap. In addition, a roamer's customer service profile may include an authorization procedure requiring a telephone service provider to obtain a verification information from a cellular telephone before registering the cellular telephone for roaming service. In this case, the billing system may instruct the switching center to connect the roamer with a service node that is configured to prompt the roamer to input the verification information, such as a personal identification number maintained in the roamer's customer service profile in the roamer clearinghouse.

As service is provided to a home-system subscriber, the billing system recomputes financial parameters, such as the prepaid balance or outstanding postpaid balance, and updates these parameters in the subscriber's customer service profile. Similarly, as service is provided to a roamer, the billing system recomputes financial parameters, such as the prepaid balance or outstanding postpaid balance, and updates these parameters in the roamer's temporary customer service profile. Once the roamer stops receiving service from the host telephone service provider, the updated customer service information is posted back to the roamer clearinghouse. Thus, the invention allows prepaid and credit-limited telephone service to be provided to roamers as well as home-system subscribers.

Cellular Mobile Radiotelephone System

A Cellular Mobile Radiotelephone System (CMR system) system is generally characterized by dividing a radio coverage area into smaller coverage areas or "cells" using low power transmitters and coverage-restricted receivers. The limited coverage area of each cell allows the radio channels used in one cell to be reused in another cell. As a cellular mobile radiotelephone (CMR) moves across the boundary of one cell and into an adjacent cell, control circuitry associated with the cells detects that the signal strength of the CMR in the just-entered cell is stronger. In response, the just-exited cell "hands-off" communications with the CMR to the just-entered cell. Each cell relays bidirectional communications between CMRs in its coverage area and a Mobile Switching Center (MSC), which connects the CMR system to the Public Switched Telephone Network (PSTN).

The MSC is preferably compatible with the Global System Communication (GSM) Mobile Application Part (MAP) or the EIA/TIA Interim Standard 41 (IS-41 standard). These standards are well known to those skilled in the art and, therefore, will only be summarized herein. Basically, a CMR system typically uses a pair of radio frequencies for each radio channel and each cell. Each cell typically includes at least one overhead data channel (also referred to as a signaling channel or an access channel), and several voice/data channels. The control channel is dedicated to receiving requests for service from CMRs, to paging selected CMRs, and to instructing the various CMRs to tune to predetermined voice/data channels, over which a voice channel conversation or data communication may take place. Accordingly, the overhead data channel is normally responsible for receiving and transmitting data to control the communication actions of the MSC the CMRs.

The control channel normally includes a forward communications channel (FOCC) for communications from the MSC to a CMR and a reverse communications channel (RECC) for communications from the CMR to the MSC. When a CMR originates a telephone call, it transmits at least one data message to the serving cell of the CMR system. This request for a cellular voice channel, commonly referred to as a "call origination" message, can be implemented as a message or signal having certain defined fields. These fields contain information that allows the MSC to identify the originating CMR The call origination message is transmitted by the CMR first to the cell serving the CMR, and then through the overhead data channel to the MSC serving the cell. The MSC usually determines whether the CMR is a subscriber of the given cellular system, i.e., a "home-system subscriber," by searching in a Home Location Register (HLR). If the CMR is not a home-system subscriber, the MSC typically communicates with other CMR systems or a clearinghouse to determine whether the CMR is an authorized subscriber of another cellular system, i.e., a "roamer" authorized to receive cellular telephone service within the service area of the given cellular system. If the MSC determines that the CMR is a "roamer" authorized to recieve cellular telephone service within the service area of the given cellular system, the MSC enters identification information for the CMR in a Visitor Location Register (VLR) for the given cellular system. The MCS then routes the telephone call requested in the call origination message to the identified called-party directory number.

The CMR identifies itself as actively present within the system through a process known as "autonomous registration" when the CMR first powers up and periodically while the CMR is active but not in use. In other words, the CMR registers for telephone service by transmitting an autonomous registration message, which is a data packet similar a call origination message. Like a call origination signal, the autonomous registration message, also referred to as a registration or an identification signal, typically includes identification information for the CMR. Unlike a call origination message, however, the autonomous registration message does not include a data field containing the digits of a dialed telephone number. A call origination message may also include a flag to distinguish this message from an autonomous registration message.

The original design intent of autonomous registration was to improve the efficiency of potential future call deliveries by keeping the MSC informed of the approximate whereabouts of each individual CMR, and to reduce paging channel load by lessening the need to page all cells to find a particular CMR. When the MSC is thus informed, it can later "page" or attempt to ring the CMR only in the cell or area in which it was last known to be located. Additional cells would be paged only if the initial page did not locate the particular CMR. Thus, the autonomous registration function is implemented as messages periodically and autonomously sent from the CMR to the serving cell at an interval specified in data parameters previously received from the cell by the cellular unit.

A person using or attempting to use a CMR in a service area outside the home service area is said to be "roaming," and the person (and the associated CMR unit) is commonly referred to as a "roamer." For example, if a subscriber of one CMR system enters the service area of another CMR system and powers on the CMR, the newly-entered CMR system receives an autonomous registration message via the overhead data channel of the particular cell in which the CMR then resides. The CMR system interprets the autonomous registration message as a request that the CMR register for operation in the particular cellular system as a roamer, which is also referred to as a "roamer registration request." In response, the identification information transmitted by the CMR is transmitted to the MSC, which quickly ascertains whether the CMR is a subscriber of the local cellular service provider (i.e., a home-system subscriber) or a subscriber of another CMR system (i.e., a roamer).

If the CMR unit is a roamer, the MSC sends a message packet to the home system for the particular CMR unit. This message indicates that the particular CMR unit has attempted to register as a roamer in another cellular system and requests information about the validity of the identification information received from the CMR unit. The CMR's home system responds by transmitting a validation message packet containing the valid identification information for the roamer. If the validation message indicates that the roamer identification information received from the CMR is valid, the MSC at the foreign cellular system adds the CMR to its list of registered users and the home cellular system adds the CMR to a list of roamers that are out of the home-system service area. The validation message may also include customer service profile information for the registering CMR, typically defining a set of communication services that are authorized for use by the particular CMR. For example, the customer service profile typically defines limitations on services to be provided to the CMR, such as access to long distance services, authorization for the CMR to only originate (and not receive) telephone calls, and the like.

When this same CMR unit registers with yet another CMR system, the database at the MSC for the home system observes that the CMR has moved again and updates its list of where the roaming CMR has most recently registered in a database system. In addition, the MSC sends a message to the foreign system where the CMR was previously registered informing this system that the roaming CMR unit has now moved on. This allows the foreign system where the CMR was previously registered to delete that CMR from its list of registered roamers. In this manner, the database at a foreign MSC does not become cluttered with data identifying previously-registered roamers after the roamers have left the MSC's service area.

The conventional CMR system as described above is configured to quickly process call origination and autonomous registration messages to facilitate a fluid movement of CMRs throughout a number of cooperating CMR systems operated by different CMR service providers. In sum, the combined CMR system has the capability to track a large number of CMRs as they move about, and to provide continuous service to these CMRs as home-system subscribers and as roamers. The various CMR service providers validate and invalidate the CMR units operated by their subscribers and may also specify customer service profile information to impose service limitations for their subscribers. Validation and customer service profile information is transmitted to other CMR service providers so that they may provide service to a roamer in accordance with the customer service profile established by the CMR's home-system service provider.

Although the conventional CMR system described above is configured to transmit customer service profile information among CMR service providers, the system is not configured to alter the customer service profile in real time. That is, the customer service profile for a particular CMR cannot be altered while service is being provided to a particular CMR, and in response to considerations based on the service that is being provided. For example, a particular CMR unit may be invalidated for non-payment, and service will be subsequently denied to the CMR. But the CMR cannot be automatically invalidated in response to a condition, such as exhaustion of a credit limit, that occurs while the CMR is in the process of conducting a communication.

The inability of the CMR system to alter customer service profile information in real time limits the ability of a CMR service provider to offer prepaid and credit-limited services.

In addition, this limitation has unfortunately been exploited by criminals to conduct enormous numbers of fraudulent telephone calls using unauthorized account information. The fundamental problem is that once a CMR is validated for service, that CMR can use a virtually unlimited amount of service. There is no way for the CMR service provider to detect the amount of usage, compute financial parameters based on the usage, and adjust the customer service profile accordingly, while the services are being used. The real-time telephone call monitoring, rating, and response system described below gives a CMR service provider this capability.

Real-Time Telephone Call Monitoring, Rating, and Response System

Exemplary embodiments of the invention are described below with reference to the appended drawings, in which like numerals refer to like elements throughout the figures. FIG. 1 is a functional block diagram of an illustrative portion of a telecommunications system 10 including a real-time telephone call monitoring, rating, and response system 11 with an associated prepaid telephone card system 12. Although the illustrative portion of a telecommunications system 10 depicts a cellular mobile radiotelephone (CMR) system, and will be referred to as the CMR system 10, those skilled in the art will appreciate that many aspects of the invention may be equivalently deployed in a land-line telecommunications system. Nevertheless, a CMR system is considered to be a preferred environment for the invention because certain advantages of the invention, such as preventing roamer fraud and bundling prepaid telephone service cards with cellular telephones, may be realized only through deployment of the invention in a CMR system.

In FIG. 1, the CMR system 10 is represented by a Mobile Switching Center (MSC) 13, which is connected to a cell transceiver 14 by way of a voice channel link 15 and an overhead data channel link 16. Throughout FIG. 1, data channel links are shown as relatively thin lines and voice channel links are shown as relatively thick lines. The cell transceiver 14 is operable for maintaining bidirectional communications 17 with a large number of CMRs, represented by the CMR 18. These bidirectional communications are conducted on a number of voice channels and an overhead data channel, as described previously.

The MSC 13 includes switching equipment 21 for linking the CMR 18 to the Public Switched Telephone Network (PSTN) 22 to connect voice channel telephone calls to the CMR 18. For example, the MSC 13 may receive a voice channel communication originating from the CMR 18 and route the communication to a terminating equipment 19 by way of a voice channel circuit 20 between the MSC 13 and the PSTN 22, and a voice channel circuit 21 between the PSTN 22 and the terminating equipment 19. Similarly, the MSC 13 may receive a voice channel communication originating from the station 19 and route the communication to the CMR 18.

The CMR system 10 includes the components traditionally used to create billing invoices for cellular telephone services. Specifically, the MSC 13 creates a billing record known as a call detail record (CDR) for each telephone call connected through the MSC. Each CDR typically includes the directory number of the originating station (i.e., the calling party directory number), the directory number of the terminating station (i.e., the called party directory number), the starting cell site, and the ending cell site. These CDRs are stored in a CDR database 24, which is periodically downloaded through a CDR database port 26 and over a data link 28 to a billing system 30.

The billing system 30 receives the CDRs from the various MSCs in the cellular service provider's system at a CDR database download unit 32, which is integrated with a subscriber account database 34. The subscriber account database 34 includes account information including rating parameters that the billing system 30 uses to compute the charges for the various telephone calls detailed in the CDRs and to prepare the appropriate invoices. These invoices are typically transmitted on a monthly basis to the cellular service provider's subscribers or, in the case of service provided to a roamer, to the roamer's home-system service provider.

The conventional MSC-to-billing system CDR processing method described above relies on after-the-fact financial computations. That is, the MSC-monitored telephone call parameters, such as the starting and ending cell sites, calling and called directory numbers, and the duration of a telephone call, are stored in the CDR database 24 at the MSC 13. At some later time, for instance on a nightly or weekly cycle, the stored CDRs are downloaded to the billing system 30, where the charges for the telephone calls are computed. Thus, the MSC 13 has no mechanism in place to respond to financial considerations based on the cost of a telephone call while the telephone call is in progress. The remaining components of the CMR system, which are described below, implement the real-time telephone call monitoring, rating, and response system 11 that allows the MSC 13 to respond to financial considerations based on the cost of a telephone call while the telephone call is taking place.

Specifically, the MSC 13 maintains in-process CDR records 36, which are created and augmented for individual telephone calls while the telephone calls are taking place. Once a particular telephone call is disconnected, the CDR is completed and stored in the CDR database 24 in the usual manner. While a particular telephone call is taking place, the MSC 13 maintains an in-process CDR 36. A real-time interface 38 exposes this in-process CDR 36 for monitoring by another system component. Namely, a real-time monitoring unit 42 within the billing system 30 monitors the in-process CDRs 36 by way of a real-time data link 40 with the real-time interface 38. The real-time interface 38 may be implemented as a ring-buffer or another suitable electronic device, and the real-time data link 40 may be implemented as an SS#7 signaling link, an IS-41 link, a microwave link, an optical fiber, or another suitable real-time data communication channel.

At the billing system 30, the real-time monitoring unit 42 is connected with a customer service profile database 44, which includes financial parameters for the subscribers of the CMR system 10. These financial parameters typically include real-time telephone call access and rating parameters, such as prepaid account balances, credit limits, prepaid and postpaid rating parameters, service conditions and limitations, and a verification information such as a personal identification number (PIN) for the account. This verification information is preferably established and altered by the subscriber only through a secure communication. For example, the PIN may be established and altered only through the mail or during a telephone call requiring additional verification, such as the subscriber's social security number, mother's maiden name, or other personal information maintained on file by the CMR service provider. Importantly, the PIN is preferably not routinely transmitted by the CMR in the overhead data channel 16, where it may be intercepted by criminals intending to conduct fraudulent CMR telephone calls.

The real-time monitoring unit 42 and the customer service profile database 44 are connected to a real-time processor 46 within the billing system 30. The real-time processor 46 computes charges for telephone calls while the telephone calls are in progress and updates the parameters in a subscriber's customer service profile, such as prepaid balances and available credit, while a telephone call is in progress. The billing system 30 may then use this information to take certain actions in real time in response to charges associated with the telephone call. These actions may include requesting verification or alternate payment authorization, disconnecting an on-going telephone call, and notifying the police of the most recent location of a detected fraudulent telephone call. To take these actions, the billing system 30 includes a command generator 48 that is connected to the real-time processor 46. The command generator 48 may also be connected to other devices, such as a roamer clearinghouse, other CMR systems, fraud detection and monitoring equipment, CMR tracking and reporting equipment, and so forth.

The command generator 48 is connected to a command processor 50 within the MSC 13 by way of a real-time data link 52. The command processor 50, in turn, is functionally connected with the switching equipment 21 within the MSC 13. The real-time links described above allow the billing system 30 to instruct MSC 13 to disconnect a telephone call or take other switching actions based on financial considerations associated with a telephone call, while the telephone call is taking place. For example, the billing system 30 may instruct the MSC 13 to interrupt an on-going telephone call and connect one or both parties with a service node 54 by way of a voice channel link 56. In this case, the service node 54 is preferably configured to prompt one or both parties to authorize an alternative payment source or otherwise make arrangements for continuing the telephone call. For example, a party may authorize the CMR system to charge a bank credit or debit card for the cost of the telephone call. Alternatively, one of the parties may a subscriber of the CMR system 10 who enters a valid PIN to increase an exceeded credit limit.

The real-time telephone call monitoring, rating, and response system 11 described above may be used to implement a wide range of prepaid and credit-limited service options. For example, the customer service profile database 44 may include a prepaid balance, a credit limit, prepaid rating parameters, and postpaid rating parameters for a particular account. The billing system 30 may use this information to charge the account for telephone services using the prepaid rating parameters until the prepaid balance is exhausted, and charge for subsequent telephone services using the postpaid rating parameters. The billing system 30 may also instruct the MSC 13 to disconnect an on-going telephone call once the prepaid balance or available credit has been exhausted.

The real-time telephone call monitoring, rating, and response system 11 also facilitates fraud prevention by allowing the billing system 30 to detect usual telephone usage patterns. For example, the billing system 30 may automatically establish a credit limit for a subscriber's account based on the account's history, such as twice the average monthly balance in the account. The billing system 30 may interpret telephone use charges in excess of this credit limit as an indication of a potentially fraudulent charge. In response, the billing system 30 may instruct the MSC 13 to connect the originating party to the service node 54, which may prompt the party for a valid PIN. If the party fails to enter the correct PIN, the MSC 13 may disconnect the telephone call and may transmit the CMR's most recent location to the police.

Prepaid Telephone Card System

The real-time telephone call monitoring, rating, and response system 11 preferably operates in connection with the prepaid telephone card system 12. This system includes a prepaid telephone service database 58 located within the billing system 30. The prepaid telephone service database 58 includes information regarding prepaid telephone service cards, such as serial numbers, face values, status codes, and so forth. The prepaid telephone service database 58 is connected with the real-time processor 46 and the customer service profile database 44 so that a subscriber having an account maintained in the billing system 30 (i.e., a subscribers of the cellular service provider operating the CMR system 10) may deposit the monetary value associated with a prepaid service telephone card in his or her respective account. It should be understood, therefore, that the prepaid telephone service cards issued by the operator of the CMR system 10 are preferably redeemed by depositing the associated value in an account maintained in the billing system 30.

The operator of the CMR system 10 orders a batch of prepaid telephone service cards, represented by the prepaid telephone service card 60, from a manufacturer. The operator of the CMR system 10 preferably specifies the serial number, face value, and expiration date for each card. The manufacturer assigns a barcode to each card and delivers the completed batch of cards to a prepaid telephone service card distribution center 62. An operator or an automatic reader at the distribution center 62, which is connected to the billing system 30 via a data channel link 64, enters the information associated with the batch of prepaid telephone service cards into the prepaid telephone service database 58 located within the billing system 30. The distribution center 62 then delivers the batch of prepaid telephone service cards to retail distribution points, represented by the retail distribution point 66. These retail distribution points then sell or give the individual prepaid telephone service cards to subscribers of the CMR system 10, or others who wish to sell or give the value of a card to subscribers of the CMR system 10.

To deposit the monetary value associated with a prepaid service telephone card into an account maintained in the billing system 30, a subscriber holding a prepaid service telephone card, or a card holder acting on a subscriber's behalf, activates the prepaid service telephone card through the prepaid service telephone card activation unit 68. The prepaid service telephone card activation unit 68 may be a voice response unit (VRU), an Internet station, or another suitable type of platform that the card holder may remotely access to enter data into the activation unit 68, preferably by engaging in an interactive communication session with the activation unit 68. Accordingly, the prepaid service telephone card activation unit 68 may be connected to the Internet 73 and/or to the PSTN 22 by way of a voice channel line 69.

Using the a VRU as an illustrative type of prepaid service telephone card activation unit 68, the card holder places a telephone call to the VRU by dialing a predefined directory number, such as a "1-800" number printed on the card. The VRU prompts the card holder to enter the serial number printed on the card and a directory number associated with an account maintained in the billing system 30. The VRU transmits this information to the billing system 30 via a data channel link 70. The billing system 30 verifies the prepaid telephone card information by referring to the prepaid telephone service database 58, and also verifies the account information (i.e., directory number associated with an account maintained in the customer service profile database 44) by referring to the customer service profile database 44. If the information entered into the VRU is verified, the caller is so notified and the indicated account is credited with the value of the prepaid telephone service card. This verification-and-deposit transaction preferably occurs within a few seconds during the course of the telephone call to the VRU.

FIG. 2 illustrates an example of a prepaid telephone card 60 for use in connection with the prepaid telephone card system 12. The front of the card 60 shows a face value 75, a unique serial number 76, and a directory number 77 that the card holder may dial to place a telephone call to the VRU. As noted above, the VRU allows the card holder to deposit the value of the card into a subscriber account maintained in the billing system 30. The back of the card 60 shows an expiration date 78 and a unique barcode 79 associated with the card. To help prevent the dissemination of counterfeit cards and card information, both the unique serial number 76, which is preferably assigned by the operator of the CMR system 10, and the unique barcode 79, which is preferably assigned by the manufacturer of the card 60, are included on each card and must be received for verification at the VRU.

FIG. 3 is an illustration of a record 80 in the prepaid telephone service database 58 for a particular prepaid telephone card. The database record 80 includes a "serial number" field 82, a "barcode number" field 84, a "face value" field 86, a "status code" field 88, a "date loaded in database" field 90, a "date received by distribution center" field 92, a "date shipped to retail distribution point" field 94, a "date used" field 96, an "expiration date" field 98, and an "applied amount" field 99. The serial number for field 82, barcode number for field 84, face value for field 86, and the expiration date field 98, which are printed on the card itself, are entered into the prepaid telephone service database 58 from the prepaid telephone service card distribution center 62 upon receipt of the card from the manufacturer.

The date received by distribution center for field 92, the date shipped to retail distribution point for field 94, and an initial status code for field 88, are also entered from the prepaid telephone service card distribution center 62. The date used for field 96 is entered from the VRU when a subscriber deposits the value of a card into an account maintained in the billing system 30. The billing system 30 enters the applied amount for field 99 and updates the status code as the value of the card is redeemed through use of telephone services.

Additional System Components For Roamers

Referring again to FIG. 1, the CMR system 10 described thus far is operational for implementing prepaid and credit-limited services for subscribers of the CMR system 10, provided that the subscriber is either placing or receiving a telephone call that is connected through an MSC within the CMR system 10. In the system described thus far, however, prepaid and credit-limited services are not available when the subscriber is roaming. Nor are prepaid and credit-limited services available for roamers who are visiting the CMR system 10. Advantageously, prepaid and credit-limited services may be extended to roamers by the addition of the roamer clearinghouse 71 and the roamer detection unit 74. That is, the roamer clearinghouse 71 and the roamer detection unit 74 allow roamers visiting the CMR system 10 to receive prepaid and credit-limited telephone services. In addition, if other CMR systems are equipped like the CMR system 10, the subscribers of the CMR system 10 will be able to receive prepaid and credit-limited services when roaming in those other CMR systems.

The roamer clearinghouse 71 is a central, preferably regional, nationwide or international, database for storing customer service profile information for the subscribers of multiple CMR systems. The roamer clearinghouse 71 is preferably updated on a continual basis as subscribers of the participating CMR systems use telephone services, increment their prepaid balances, and alter other telephone service parameters. The billing system 30 is connected to the roamer clearinghouse 71 via a real-time data channel link 72. This allows the billing system 30 to respond to a detected roamer registration by downloading the roamer's customer service profile from the roamer clearinghouse 71. The billing system 30 then enters the roamer's customer service profile as a temporary record in the customer service profile database 44. This configures the CMR system 10 in real time to provide prepaid and credit-limited telephone services to the roamer.

The roamer detection unit 74 is operable for monitoring the MSC's overhead data channel processor 76. The overhead data channel processor 76 receives CMR identification information in autonomous registration and call origination messages from the CMRs within the coverage areas of the cells served by the MSC 13. This allows the roamer detection unit 74 to detect a roamer as it registers for service with the MSC 13. The roamer detection unit 74 extracts or duplicates the CMR identification information and transmits the identification information to the real-time interface 38. This allows the real-time monitoring unit 42 within the billing system 30 to detect a roamer as it attempts to register for service with the MSC 13. In response, the billing system 30 downloads the roamer's customer service profile from the roamer clearinghouse 71. Once the roamer becomes unregistered for services with the MSC 13, typically by attempting to register with another MSC or becoming inactive for an extended period of time, the billing system 30 posts the temporary record, as adjusted for services provided by the CMR system 10, back in the roamer clearinghouse 71.

The roamer clearinghouse 71 may be connected with a dial-in voice response unit (VRU) or Internet station to implement a wide variety of fraud prevention techniques. For example, subscribers that roam infrequently may be asked to dial the clearinghouse VRU and enter a PIN number to activate roaming service. When finished roaming, the subscriber may be asked to again dial the clearinghouse VRU and to deactivate roaming service. If the subscriber fails to deactivate roaming service as expected, roaming service may be automatically deactivated or the subscriber may be asked to enter a PIN number upon a subsequent registration to continue receiving roaming service. In this manner, the subscriber's account will be unavailable for fraudulent roaming charges when the account is inactive for roaming services. In addition, when the account is active for roaming services, the subscriber's CMR periodically transmits autonomous registration messages while the CMR is active but not in use. These registration messages allow the roamer clearinghouse 71 to track the location of the CMR and identify potentially fraudulent roamer registrations that occur outside the CMR's general location.

For subscribers that use roaming services more frequently, activating and deactivating roaming service on an as-needed basis may be cumbersome. In this case, the roamer's customer service profile in the roamer clearinghouse 71 may contain historical usage information and verification information in addition to prepaid balances and credit limits for the CMR. The roamer clearinghouse 71 may use this information to prevent very large fraudulent roaming charges. For example, the roamer clearinghouse 71 may detect unusual roaming charges during the course of a telephone call and take appropriate actions, such as connecting the CMR with a service node that prompts the user to enter the verification information. If the user fails to enter the proper verification information, telephone service may be discontinued and the CMR's location may be transmitted to the police.

Impossible or unusual roaming patterns may be also detected and used to prevent fraud and assist in the arrest of the responsible criminals. For example, the roamer clearinghouse 71 may readily detect the same CMR simultaneously registering for service in two locations and take appropriate actions in response, such as asking each user to enter verification information. The clearinghouse may also readily detect unusual geographic leaps in a CMR's roaming pattern and take appropriate actions in response. Those skilled in the art will appreciate that CMR system 10 may be used or modified to provide many other prepaid and credit-based service and to implement many other and fraud prevention techniques.

Operation of the Exemplary Embodiments

FIGS. 4–8 are logic flow diagrams that illustrate methods for implementing several illustrative prepaid and credit-limited services for home-system subscribers and roamers. Those services illustrated for home-system subscribers may be implemented for roamers and vice versa. Those skilled in the art will understand that the specific services illustrated in FIGS. 4–8 are but a few specific examples of a broad class of prepaid and credit-limited telephone services that may be implemented using the CMR system 10. Because the services illustrated in FIGS. 4–8 may be implemented within the CMR system 10 shown in FIG. 1, reference will be made to the system components shown in FIG. 1 throughout the following description of FIGS. 4–8.

Figure 4:
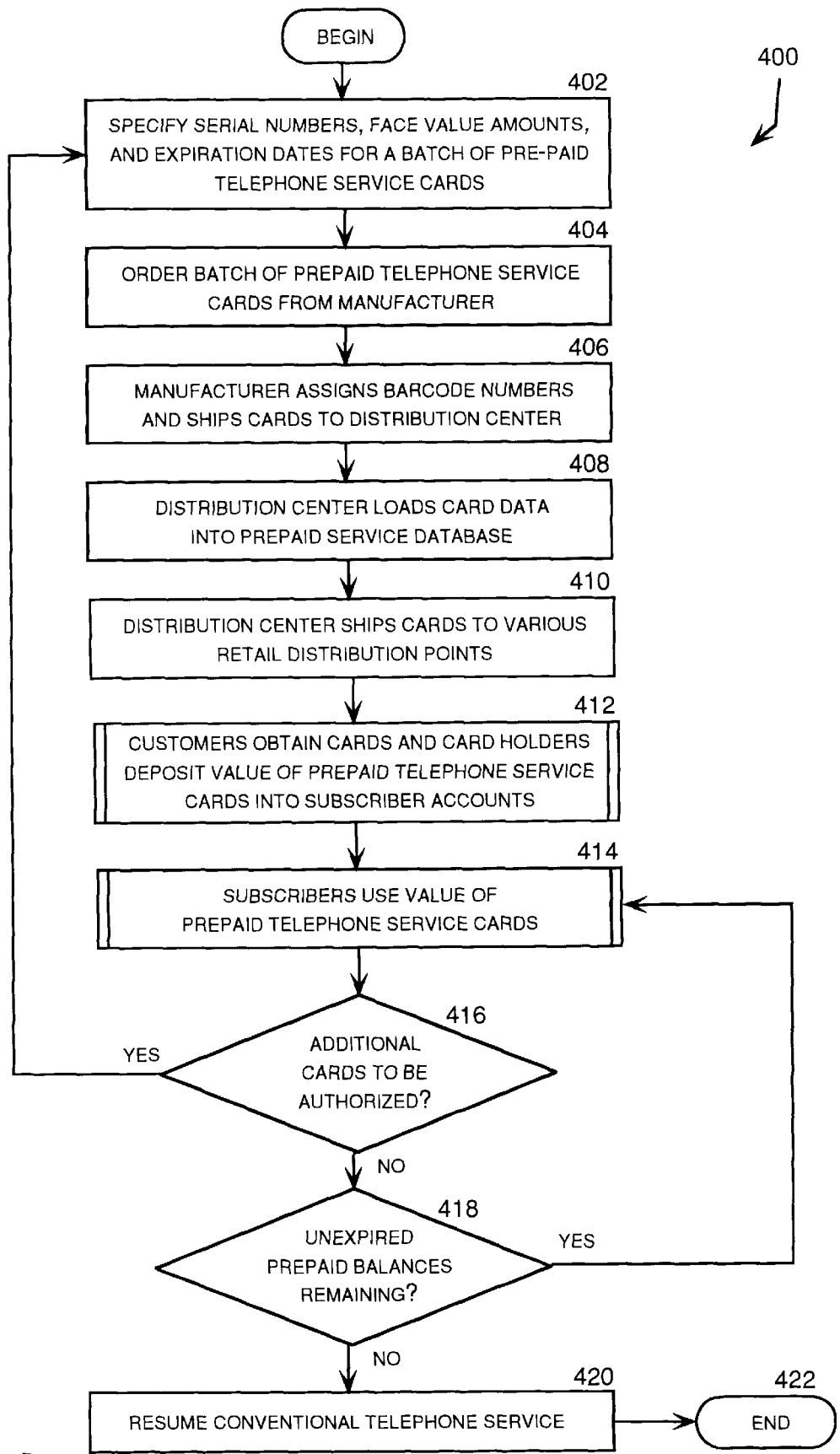
FIG. 4 is a logic flow diagram illustrating a method for providing prepaid and credit-limited telephone services.

FIG. 4 is a logic flow diagram illustrating a method for operating a prepaid telephone card system. In step 402, a CMR system operator specifies serial numbers, face value amounts, and expiration dates for a batch of prepaid telephone service cards. Each card is redeemable by depositing the value of the cards into a subscriber account maintained in the billing system 30. In step 404, the operator of the CMR system 10 orders a batch of prepaid telephone service cards from a card manufacturer, who assigns a barcode number to each card. Once the cards have been manufactured, the manufacturer ships the cards to the prepaid telephone card distribution center 62.

In step 408, the distribution center 62 loads information associated with the prepaid telephone service cards into the prepaid telephone service database 58 within the billing system 30. This information preferably includes serial number, face value, expiration date, barcode number, and an initial status code for each card. In step 410, the distribution center ships the prepaid telephone service cards to various retail distribution points 66, which sell or give the cards to subscribers of the CMR system 10 or others who obtain the cards on behalf of subscribers of the CMR system 10. In routine 412, individual card holders access the prepaid service telephone card activation unit 68 to deposit the value of the cards into telephone service accounts maintained in the billing system 30. A roamer may also deposit the value of a prepaid telephone service card into a temporary subscriber account maintained in the billing system 30, which temporary account may downloaded from the roamer clearinghouse 71. Routine 412 is described in more detail below with reference to FIG. 5. In routine 414, subscribers of the CMR system 10 use the value of the prepaid telephone service cards that were deposited in their respective accounts. Routine 414 is described in more detail below with reference to FIG. 6.

Routine 414 is followed by decision step 416, in which the operator of the CMR system 10 determines whether additional cards are to be authorized. If additional prepaid telephone service cards are to be authorized, the "YES" branch is followed back to step 402, in which the operator of the CMR system 10 specifies serial numbers, face value amounts, and expiration dates for another batch of prepaid telephone service cards. If additional prepaid telephone service cards are not to be authorized, the "NO" branch is followed to decision step 418, in which the operator of the CMR system 10 determines whether there are unexpired prepaid balances remaining for previously issued prepaid telephone service cards.

If there are unexpired prepaid balances remaining for previously issued prepaid telephone service cards, the "YES" branch is followed back to routine 414, in which subscribers of the CMR system 10 continue to use the value of the prepaid telephone service cards. If there are no further prepaid telephone service cards having unexpired balances, the "NO" branch is followed from step 418 to step 420, in which the CMR system 10 returns to conventional telephone service. That is, no further prepaid telephone services will be provided until the operator of the CMR system 10 issues additional prepaid telephone service cards. Step 420 is followed by the "END" step 422, which completes routine 400.

Figure 5:
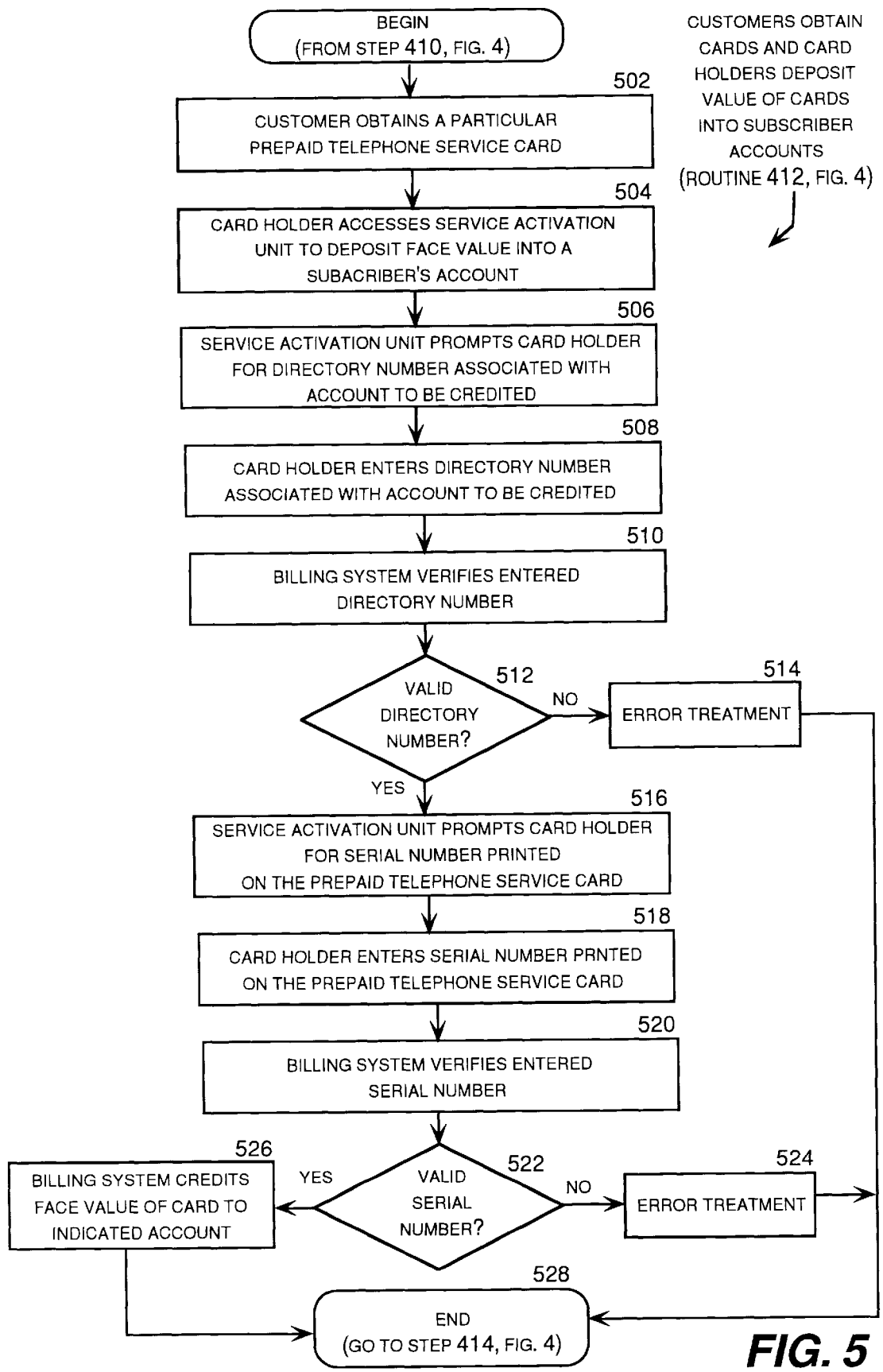
FIG. 5 is a logic flow diagram illustrating a method for receiving prepaid telephone card deposits.

FIG. 5 is a logic flow diagram illustrating routine 412, in which card holders deposit the value associated with prepaid telephone service cards in their respective telephone service accounts. Routine 412 follows step 410 shown on FIG. 4. Although routine 412 is described for a prepaid service telephone card activation unit 68 that includes a VRU, those skilled in the art will appreciate that other types of prepaid service telephone card activation units could be used. In particular, the prepaid service telephone card activation unit 68 could equivalently include an Internet station or another suitable type of remotely accessable platform.

In step 502, a person obtains a particular prepaid telephone service card from a retail distribution point 66. In step 504, the card holder places a telephone call to the VRU to deposit the face value of the card in an account maintained in the billing system 30. This account may be a home-system account maintained in the subscriber account database 34, or it may be a temporary roamer account downloaded from the roamer clearinghouse 71. If the account identified by the card holder is a roamer account, the billing system 30 may download a customer service profile for the roamer account from the roamer clearinghouse 71.

In step 506, the VRU prompts the card holder for a directory number associated an account maintained in the billing system 30. In step 508, the card holder enters the directory number associated with the account to be credited with the value of the prepaid telephone service card. In step 510, the billing system 30 verifies the directory number entered by the card holder. Specifically, the billing system 30 checks to make sure that the directory number entered by the card holder is a valid directory number associated with an account maintained in the billing system 30.

Step 510 is followed by decision step 512, in which the billing system 30 determines whether the directory number entered by the card holder is a valid directory number associated with an account maintained in the billing system 30. If the directory number is not valid, the "NO" branch is followed to step 514, in which the prepaid service telephone card activation unit 68 applies an appropriate error treatment. For example, the VRU may prompt the card holder to try again a predetermined number of times. If the card holder does not enter a valid directory, the VRU may disconnect the telephone call. Step 514 is followed by step 528, which returns to step 414 on FIG. 4.

Referring again to step 512, if the card holder enters a valid directory number, the "YES" branch is followed to step 516, in which the VRU prompts the card holder for the serial number (and optionally the barcode number) printed on the prepaid telephone service card. In step 518, the card holder enters the serial number (and optionally the barcode number) printed on the prepaid telephone service card. In step 520, the billing system 30 verifies the serial number (and optionally the barcode number) entered by the caller. Specifically, the billing system 30 determines whether the serial number (and optionally the barcode number) entered by the card holder corresponds to a prepaid telephone service card record in the prepaid telephone service card database 58 maintained within the billing system 30.

Step 520 is followed by decision step 522, in which the billing system 30 determines whether the serial number (and optionally the barcode number) is valid. If the serial number (and optionally the barcode number) is not valid, the "NO" branch is followed to step 524, in which the VRU applies an appropriate error treatment. If the serial number (and optionally the barcode number) is valid, the "YES" branch is followed to step 526, in which the billing system 30 credits the face value of the prepaid telephone service card to the indicated account. In other words, the billing system 30 credits the account associated with the directory number entered in step 508 with the face value of the prepaid telephone service card associated with the serial number entered in step 520. Steps 526 and 524 are followed by the "END" step 528, which returns to step 414 shown on FIG. 4.

Figure 6:
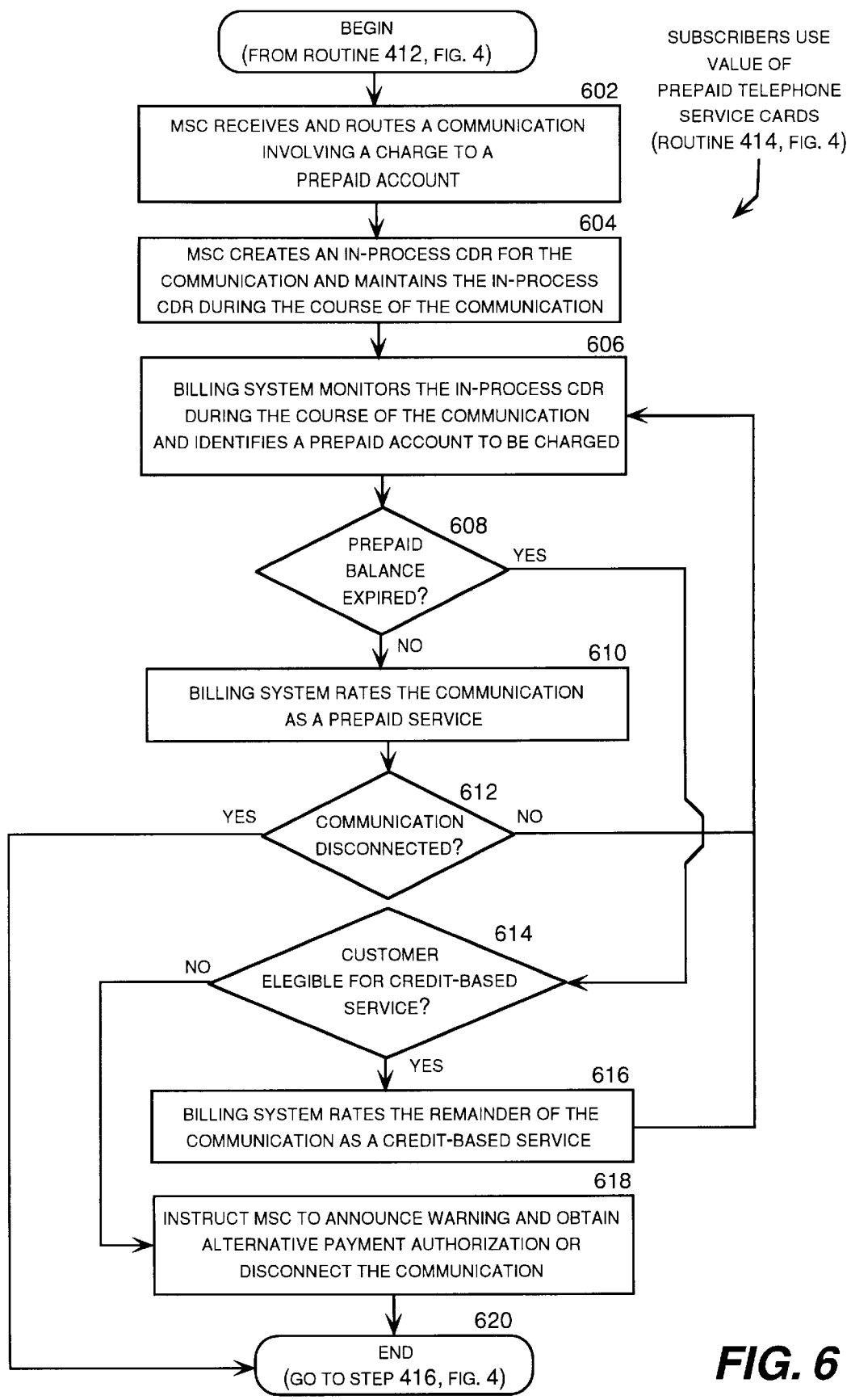
FIG. 6 is a logic flow diagram illustrating a method for charging the cost of telephone services to a prepaid account.

FIG. 6 is a logic flow diagram illustrating routine 414, in which subscribers of the CMR system 10 use the value of prepaid telephone service cards that were deposited into their respective telephone service accounts. Routine 414 begins following routine 412 shown on FIG. 4. In step 602, the MSC 13 receives and routes a communication involving a charge to an account maintained in the billing system 30. In step 604, the MSC 13 creates an inprocess CDR 36 for the communication. This in-process CDR remains open, and is augmented by the MSC 13, during the course of the communication.

In step 606, the real-time monitoring unit 42 within the billing system 30 monitors the in-process CDR 36. The information in the in-process CDR 36 allows the billing system 30 to identify the prepaid account to be charged for the communication in real time. In addition, the information in the in-process CDR 36, in conjunction with the information in the customer service profile database 58 associated with the prepaid account to be charged for the communication, allows the billing system 30 to compute the charges associated with the communication in real time. This allows the billing system 30 to implement a wide variety of prepaid and credit-limited telephone services.

For example, in step 608 the billing system 30 determines whether the prepaid balance in the prepaid account becomes exhausted during the course of the communication. If the prepaid balance is not exhausted, the "NO" branch is followed to step 610, in which the billing system 30 rates the communication as a prepaid telephone service. Step 610 is followed by decision step 612, in which the billing system 30 determines whether the communication has been disconnected. If the communication has not been disconnected, the "NO" branch is followed back to step 606, in which the billing system 30 continues to monitor the in-process CDR 36 and make the computations necessary to implement the prepaid or credit-limited telephone services. If the communication has been disconnected, the "YES" branch is followed to the "END" step 620, which returns to step 416 shown on FIG. 4.

Referring again to step 608, if the prepaid balance becomes exhausted during the course of the communication, the "YES" branch is followed to step 614, in which the billing system 30 determines whether the account being charged for the communication is eligible for credit-based telephone service. If the account is eligible for credit-based telephone service, the "YES" branch is followed to step 616, in which the billing system 30 rates the remainder of the communication as a credit-based telephone service. From step 616, routine 414 loops back to step 606, in which the billing system 30 continues to monitor the in-process CDR 36. Referring again to step 614, if the account is not eligible for credit-based service, the "NO" branch is followed to step 618 in which the billing system 30 instructs the MSC 13 to announce a warning and obtain alternate payment authorization. For example, the originating parties to the communication may be connected to the service node 54, which prompts the party to authorize an alternate payment source, such as a bank credit or debit card account. If an alternate payment source is not authorized, the MSC 13 disconnects the communication. Step 618 is followed by the "END" step 620, which returns to step 416 shown on FIG. 4.

Figure 7:
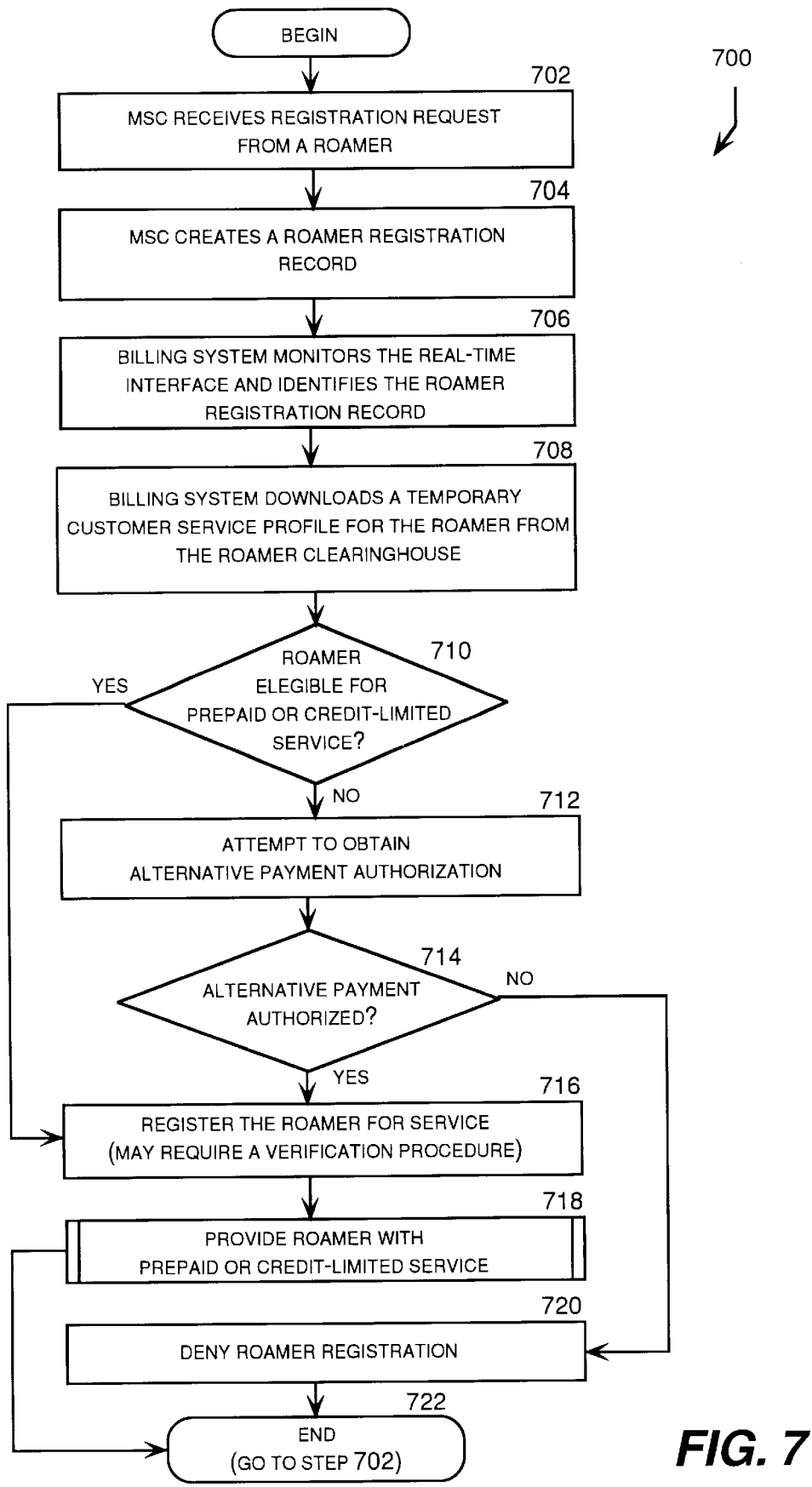
FIG. 7 is a logic flow diagram illustrating a method for registering a roamer for prepaid or credit-limited telephone services.

FIG. 7 is a logic flow diagram illustrating routine 700 for registering a roamer to receive prepaid or credit-based telephone services. In step 702, the MSC 13 receives a registration request from a roamer. In step 704, the roamer detection unit 74 within the MSC 13 creates a roamer registration record. The roamer detection unit 74 makes this roamer registration record available for monitoring at the real-time interface 38 within the MSC 13.

In step 706, the real-time monitoring unit 42 within the billing system 30 monitors the real-time interface 38 within the MSC 13. This allows the real-time monitoring unit 42 to identify the roamer registration record. In step 708, the billing system 30 downloads a temporary customer service profile for the registering roamer from the roamer clearinghouse 71. In step 710, the billing system 30 determines whether the roamer is eligible for prepaid or credit-limited telephone service. If the roamer is not eligible for prepaid or credit-limited telephone service, the "NO" branch is followed to step 712.

In step 712, the billing system 30 instructs the MSC 13 to attempt to obtain alternate payment authorization, typically by connecting the roamer to a voice response unit within the service node 54. The service node may then receive alternate payment authorization, such as a bank credit or debit card number. In step 714, the billing system 30 determines whether an alternate payment source has been authorized. If an alternate payment source has not been authorized, the "NO" branch is followed to step 720, in which the MSC 13 denies registration to the roamer. Step 720 is followed by the "END" step, which returns to step 702.

Referring again to step 710, if the roamer is eligible for prepaid or credit-limited service, the "YES" branch is followed to step 716. In addition, the "YES" branch is followed from step 714 to step 716 if an alternate payment source is authorized for the roamer. At this point, the roamer may be asked to provide a verification information, such as a PIN obtained from the roamer's customer service profile. Other fraud prevention techniques may also be employed prior to registering the roamer for service, such as determining whether the roamer is already registered for service at another MSC, or whether an unusual geographic leap has occurred since the roamer's most recent registration. If roamer is cleared for service, the MSC 13 registers the roamer telephone service in step 716. Step 716 is followed by routine 718, in which the CMR system 10 provides roamer with prepaid or credit-limited telephone services. Routine 718 is described in detail with reference to FIG. 8. Routine 718 is followed by the "END" step, which returns to step 702.

FIG. 8 is a logic flow diagram illustrating routine 718 for providing a roamer with prepaid or credit-limited telephone service. Routine 718 begins after step 716 shown on FIG. 7. In step 802, the MSC 13 receives and routes a communication involving a charge to the roamer's account. In other words, the MSC 13 routes a voice channel circuit for conducting a telephone call involving the roaming CMR. It should be understood that this communication may be originated by the roamer, or the communication may be originated by another station and directed to the roamer. That is, the prepaid and credit-limited services described with references to FIG. 8 may be applied to telephone calls placed by, and telephone calls received by, the roamer.

In step 804, the MSC 13 creates an in-process CDR 36 for the communication. The MSC 13 maintains the in-process CDR 36 during the course of the communication. The MSC 13 also makes the in-process CDR 36 available for monitoring at the real-time interface 38 during the course of the communication. In step 806, the real-time monitoring unit 42 within the billing system 30 monitors the in-process CDR 36 during the course of the communication and uses the information in the in-process CDR 36 to identify an account to be charged. Specifically, the account to be charged is an account in the subscriber account database 34 maintained within the billing system 30 or a temporary account associated with a temporary customer service profile for a roamer obtained from the roamer clearinghouse 71.

In step 808, the billing system 30 determines whether a prepaid balance exists for the account. If a prepaid balance exists for the account, the "YES" branch is followed to step 810, in which the billing system 30 rates the communication as a prepaid service. Step 810 is followed by step 812, in which the billing system 30 determines whether the communication has been disconnected. If the communication has not been disconnected, the "NO" branch is followed back to step 806, in which the billing system 30 continues to monitor the in-process CDR 36.

If the communication has been disconnected, the "YES" branch is followed from step 812 to step 820, in which the billing system 30 posts recomputed customer service data for the roamer to the roamer clearinghouse 71. It should be understood that in step 820, the billing system 30 may wait until the roamer becomes unregistered for service with the MSC 13, typically by registering for service with another MSC or becoming idle for an extended period of time, before posting the recomputed customer service data for the roamer to the roamer clearinghouse 71. Step 820 is followed by the "END" step 822, which returns to step 722 shown on FIG. 7.

Referring again to step 808, if there is not a prepaid balance for the account, the "NO" branch is followed to step 814, in which the billing system 30 determines whether an unexhausted credit limit exists for the account. If an unexhausted credit limit exists for the account, the "YES" branch is followed to step 816, in which the billing system 30 rates the communication, or the remaining portion of the communication, as a credit-based service. After step 816, routine 718 loops to step 806 in which the billing system 30 continues to monitor the in-process CDR 36 for the communication.

Referring again to step 814, if the account is not authorized for credit-based services, the "NO" branch is followed from step 814 to step 818, in which the MSC 13 obtains an alternate payment source or disconnects the communications. The MSC 13 typically connects the originating party to the service node 54, which announces a warning and attempts to obtain alternate payment authorization to continue the communication. If alternate payment authorization is obtained, the telephone call may be continued. If alternate payment authorization is not obtained, the communication is disconnected. Step 818 is followed by step 820, in which the billing system 30 recomputes the customer service data for the roamer. The billing system 30 then posts the recomputed customer service data for the roamer in the roamer clearinghouse 71. Step 820 is followed by the "END" step 822, which returns to step 722 shown on FIG. 7.

Land-Line Embodiment

The invention may be implemented in a CMR system, as described above. As noted previously, the invention may also be implemented in a land-line telephone system. In this case, the "ANI" calling-line directory number provides the originating switch with identification information regarding the originating station. The ANI calling-line directory number will be recognized as the land-line analog to the CMR indentification information received at the MSC 13 via the overhead data channel 16 in a CMR embodiment. A real-time telephone call monitoring, rating, and response system may be constructed for the land-line telephone system by installing real-time interfaces in the land-line central switching offices, and by installing a real-time monitoring unit in the billing system that serves the central offices. This type of land-line system may be used to implement prepaid and credit-limited services for telephone calls placed on subscriber telephone lines. This will be recognized as the analog of providing prepaid and credit-limited services to home-system CMR subscribers.

In the land-line analog of CMR roaming, a land-line subscriber may place a telephone call from a telephone that is not connected to his or her dedicated telephone line. For example, the land-line subscriber may pick up another subscriber's telephone and dial a special telephone number to reach an intelligent telephone service platform, commonly referred to as a "calling card platform." The calling card platform is configured to receive an account number and a called-party directory number from the calling party. The calling card platform then routes a telephone call to the called party directory number and bills the cost of the telephone call to the indicated account. To implement prepaid or credit-limited services, the calling card platform, which remains in the voice channel circuit, may be configured to implement prepaid and credit-limited telephone services.

Of course, configuring a calling card platform to implement prepaid and credit-limited telephone services would require trunking each prepaid or credit-limited telephone call through the calling card platform. This is very similar to a conventional prepaid telephone card system, in which the card holder dials a special telephone number to reach an intelligent voice-channel-connected platform. As such, this type of land-line prepaid telephone card system would result in the drawbacks described previously with respect to conventional prepaid telephone card systems, such as duplication of switching equipment and routing of double-trunked voice channel circuits.

To avoid these drawbacks, the originating switch may be configured with a mechanism for recognizing a prepaid or credit-limited telephone call to be charged to an account other than the account associated with the line on which the telephone call was originated. For example, the originating switch may be configured to recognize a trigger code, such as *88 or another standard code, followed by an account number as an indication of a prepaid or credit-limited telephone call that is to be billed to the indicated account. This information will be recognized as the land-line analog of the CMR identification information received from a roamer in a CMR embodiment. The detection equipment at the originating switch that recognizes the trigger code and the associated account number will be recognized as the analog to the roamer detection unit 74 described above in connection with the CMR embodiment.

In response to a detected trigger code, the billing system, which is functionally connected to the originating switch via a real-time interface, may download a temporary customer service profile for the indicated account from a land-line subscriber clearinghouse. The billing system and the originating switch may then implement prepaid or credit-limited telephone services in accordance with the parameters in the account. The land-line subscriber clearinghouse will be recognized as the land-line analog of the roamer clearing house 71 in the CMR embodiment described above. In this manner, a real-time communication monitoring, rating, and response system may be implemented for a land-line telephone system.

In view of the foregoing, it should be appreciated that the real-time communication monitoring, rating, and response system described above, in conjunction with the associated prepaid telephone card system, is operative for providing prepaid and credit-based telecommunication services to home-system subscribers and roamers. It should be understood that the foregoing relates only to the preferred embodiments of the present invention, and that numerous changes may be made therein without departing from the spirit and scope of the invention as defined by the following claims.

What is claimed is:

1. A method for providing prepaid telephone services, comprising the steps of:

establishing and maintaining a subscriber account in a billing system configured to receive call detail records from a switching center at predetermined times via a non-voice data link for the purpose of computing charges for telephone calls;

receiving a monetary deposit establishing a prepaid balance in the account;

establishing a customer service profile including prepaid rating parameters and postpaid rating parameters for the account;

connecting a communication between an originating station and a terminating station through the switching center, the communication incurring charges to the account; and during the course of the communication, at the switching center, creating and maintaining an in-process call detail record for the communication and providing a real-time interface for externally monitoring the in-process call detail record for the communication, and at the billing system, accessing the real-time interface via a second non-voice data link to monitor the in-process call detail record for the communication, charging against the prepaid balance in the account a cost associated with a prepaid portion of the communication based on the prepaid rating parameters in the customer service profile, and in response to a determination that the prepaid balance in the account is exhausted, charging the account for a cost associated with the remainder of the communication and based on the postpaid rating parameters.

2. The method of claim 1, wherein the step of receiving the monetary deposit establishing the prepaid balance in the account comprises the steps of:

issuing a prepaid telephone service card having an associated value; and receiving a monetary deposit of the value associated with the prepaid telephone service card for the account.

3. The method of claim 1, wherein the step of receiving the monetary deposit establishing the prepaid balance in the account comprises the steps of:

specifying serial numbers and face value amounts for a batch of prepaid telephone service cards;

distributing the batch of prepaid telephone service cards among a group of retail distribution points;

entering the serial numbers and face value amounts for the batch of prepaid telephone service cards into a prepaid telephone service database within the billing system;

receiving a prepaid deposit communication indicating a directory number associated with the subscriber account and a particular serial number specified for a particular prepaid telephone service card; and crediting the subscriber account with the face value associated with the particular prepaid telephone service card.

4. A method for providing credit-limited telephone services, comprising the steps of:

in a billing system configured to receive call detail records from a switching center at predetermined times via a non-voice data link for the purpose of computing charges for telephone calls, establishing a subscriber account maintaining a postpaid balance;

establishing a customer service profile including a credit limit for the account;

connecting a communication between an originating station and a terminating station through the switching center, the communication incurring a cost charged to the account; and during the course of the communication, at the switching center, creating and maintaining an in-progress call detail record for the communication and exposing a real-time interface operable for externally monitoring the in-process call detail record for the communication, and at the billing system, accessing the real-time interface via a second non-voice data link to monitor the in-process call detail record for the communication, charging against the postpaid balance in the account a cost associated with the communication, and in response to a determination that the postpaid balance in the account exceeds the credit limit, taking a predefined action.

5. The method of claim 4, further comprising the steps of:
- at the billing system, generating a command to be executed by the switching center during the course of the communication and transmitting the command to the switching center; and
- at the switching center, responding to the command.

6. The method of claim 5, wherein the switching center disconnects the communication in response to the command.

7. The method of claim 5, wherein the the switching center performs the following steps in response to the command:
- announcing to the originating station or to the terminating station that the credit limit has been exceeded;
- receiving an alternate payment source authorization for continuing the communication; and
- charging a cost associated with continuing the communication to the alternate payment source.

8. The method of claim 4, wherein the predefined action comprises modifying rating parameters used to compute a cost associated with continuing the communication based on the balance in the account.

9. A method for providing prepaid telephone services, comprising the steps of:
- specifying a serial number and face value for a prepaid telephone service card;
- distributing the prepaid telephone service card to a retail distribution point;
- entering the serial number and face value for the prepaid telephone service card into a prepaid telephone service database within a billing system configured to receive call detail records from a switching center at predetermined times via a non-voice data link for the purpose of computing charges for telephone calls;
- receiving a prepaid deposit communications identifying a directory number associated with a subscriber account and the serial number specified for the prepaid telephone service card;
- crediting the subscriber account with a prepaid balance equal to the face value of the prepaid telephone service card;
- establishing a customer service profile including prepaid rating parameters and postpaid rating parameters for the account;
- connecting through the switching center a communication incurring a cost charged to the account; and
- during the course of the communication,
  - at the switching center, creating and maintaining an in-process call detail record for the communication and exposing a real-time interface operable for externally monitoring the in-process call detail record for the communication, and
  - at the billing system,
    - accessing the real-time interface via second non-voice data link to monitor the in-process call detail record for the communication,
    - accessing the prepaid telephone service database to determine a prepaid balance for the account,
    - charging the account for a cost associated with a prepaid portion of the communication and based on the prepaid rating parameters in the customer service profile for the account,
    - detecting the exhaustion of the prepaid balance for the account, and
    - in response to detecting the exhaustion of the prepaid balance for the account, charging the account for a cost associated with the remainder of the communication and based on the postpaid rating parameters in the customer service profile for the account.

10. The method of claim 9, further comprising the steps of:
- including a credit limit in the customer service profile for the account; and
- during the course of the communication,
  - adding a cost associated with a portion of the communication to a postpaid balance in the account,
  - determining whether the postpaid balance in the account exceeds the credit limit; and
- in response to a determination that the postpaid balance in the account exceeds the credit limit, disconnecting the communication.

11. The method of claim 9, further comprising the steps of:
- including a credit limit in the customer service profile for the account; and
- during the course of the communication,
  - adding a cost associated with a portion of the communication to a postpaid balance in the account,
  - determining whether the postpaid balance in the account exceeds the credit limit, and
  - in response to a determination that the postpaid balance in the account exceeds the credit limit,
    - announcing to the originating station or to the terminating station that the credit limit has been exceeded,
    - receiving an alternate payment source for continuing the communication, and
    - charging a cost associated with continuing the communication to the alternate payment source.

12. The method of claim 9, further comprising the step of, during the course of the communication, modifying the postpaid rating parameters based on the amount of the postpaid balance in the account.

13. In a telecommunications system, a switching center coupled to a billing system via a non-voice data link for downloading call detail records from the switching center to the billing system at predetermined times for the purpose of computing charges for telephone calls, the switching center comprising:
- switching equipment for connecting a communication circuit for conducting a communication between an originating station and a termination station;
- a call detail record processor coupled to the switching equipment for creating and maintaining an in-process call detail record for the communication during the course of the communication; and
- a real-time interface coupled to the call detail record processor for externally monitoring the in-process call detail record during the course of the communication via a second non-voice data link.

14. The switching center of claim 13, further comprising:
- a command processor coupled to the switching equipment for receiving a disconnection command based on the in-process call detail record during the course of the communication and, in response to the disconnection command, causing the switching equipment to disconnect the communication.

15. The switching center of claim 14, wherein:
- the command processor is further operable for receiving an alternate payment command based on the in-process call detail record during the course of the communication and, in response to the alternate payment command, causing the switching equipment to connect a communication circuit between the originating station or the termination station and a service node configured for accepting alternate payment information.

16. In a telecommunications system, a billing system configured to receive call detail records from a switching center at predetermined times via a non-voice data link for the purpose of computing charges for telephone calls, the billing system comprising:

a customer service profile database for maintaining a customer service profile for an account including a prepaid balance, prepaid rating parameters, and postpaid rating parameters;

a real-time monitoring unit for monitoring an in-process call detail record maintained within a switching center via a second non-voice data link, the in-process call detail record corresponding to an on-going communication connected through the switching center and involving a charge to the account; and a real-time processor coupled to the customer service profile database and to the real-time monitoring unit for, during the course of the communication, charging the account for a cost associated with a prepaid portion of the communication and based on the prepaid rating parameters, detecting the exhaustion of the prepaid balance in the account, and in response to the exhaustion of the prepaid balance in the account, charging the account for a cost associated with the remainder of the communication and based on the postpaid rating parameters.

17. The billing system of claim 16, wherein the customer service profile further includes a credit limit, and the real-time processor is further operable for computing a postpaid balance for the account during the course of the communication and determining whether the postpaid balance in the account is equal to or exceeds the credit limit, further comprising:

a command generator functionally connected to the real-time processor for generating a disconnection command in response to a determination by the real-time processor that the postpaid balance in the account is equal to or exceeds the credit limit, the disconnection command for instructing the switching center to disconnect the communication.

18. The billing system of claim 16, further comprising a prepaid telephone service database for:

maintaining prepaid telephone service information;

receiving information from a prepaid telephone service card activation unit including a directory number associated with the account and a serial number associated with a prepaid telephone service card; and crediting the account with a value associated with the prepaid telephone service card.

19. In a telecommunications system, a billing system configured to receive call detail records from a switching center at predetermined times via a non-voice data link for the purpose of computing charges for telephone calls, the billing system comprising:

a subscriber account database including a subscriber account having a postpaid balance;

a customer service profile database maintaining a customer service profile including a credit limit for the account;

a real-time monitoring unit for monitoring an in-process call detail record maintained within a switching center via a second non-voice data link, the in-process call detail record corresponding to an on-going communication connected through the switching center and involving a charge to the account; and a real-time processor coupled to the customer service profile database and the real-time monitoring unit for, during the course of the communication, adding a cost associated with the communication to the postpaid balance for the account, and determining whether the postpaid balance in the account is equal to or exceeds the credit limit; and a command generator functionally connected to the real-time processor for generating a disconnection command in response to a determination by the real-time processor that the postpaid balance in the account is equal to or exceeds the credit limit, the disconnection command for instructing the switching center to disconnect the communication.

20. The system of claim 19, wherein:

the command generator is further operable for generating an alternate payment command in response to the determination by the real-time processor that the postpaid balance in the account is equal to or exceeds the credit limit, the alternate payment command for instructing the switching center to obtain alternate payment instructions for continuing the communication.

21. In or for a telecommunications system, a system for providing prepaid and credit-limited telecommunication services, comprising:

a switching center including, switching equipment for connecting a communication circuit between an originating station and a termination station for conducting a communication involving a charge to an account, a call detail record processor coupled to the switching equipment for creating and maintaining an in-process call detail record for the communication during the course of the communication, and a real-time interface coupled to the call detail record processor for externally monitoring the in-process call detail record during the course of the communication via a first non-voice data link; and a billing system configured to receive call detail records from the switching center at predetermined times via a second non-voice data link for the purpose of computing charges for telephone calls, the billing system including, a customer service profile database for maintaining a customer service profile for the account, the customer service profile including prepaid rating parameters and postpaid rating parameters, a real-time monitoring unit for externally monitoring the in-process call detail record corresponding to the communication via the first non-voice data link, and a real-time processor coupled to the customer service profile database and the real-time monitoring unit for, during the course of the communication, charging the account for a cost associated with a prepaid portion of the communication and based on the prepaid rating parameters and the prepaid balance in the account, detecting the exhaustion of the prepaid balance in the account, and in response to the exhaustion of the prepaid balance in the account, charging the account for a cost associated with the remainder of the communication and based on the postpaid rating parameters.

22. The system of claim 21, further comprising:

a prepaid telephone service card activation unit for receiving prepaid telephone service information including a directory number associated with the account and a serial number associated with a prepaid telephone service card; and a prepaid telephone service database coupled to the prepaid telephone service card activation unit for, maintaining prepaid telephone service information;

receiving the directory number associated with the account and the serial number associated with the prepaid telephone service card from the prepaid telephone service card activation unit, and crediting the account with a value associated with the prepaid telephone service card.

23. The system of claim 21, wherein:

the customer service profile further includes a credit limit;

the switching center further comprises a command processor coupled to the switching equipment for receiving a disconnection command from the billing system, the disconnection command based on the in-process call detail record monitored by the billing system during the course of the communication and causing the switching equipment to disconnect the communication;

the real-time processor of the billing system is further operable for computing a postpaid balance for the account during the course of the communication and determining whether the postpaid balance in the account is equal to or exceeds the credit limit; and the billing system further comprises a command generator functionally connected to the real-time processor for generating the disconnection command in response to a determination by the real-time processor that the postpaid balance in the account is equal to or exceeds the credit limit.

24. The system of claim 21, wherein:

the customer service profile further includes a credit limit;

the switching center further comprises a command processor coupled to the switching equipment for generating an alternate payment command in response to the determination by the real-time processor that the postpaid balance in the account is equal to or exceeds the credit limit; and the command processor is further operable for receiving an alternate payment command from the billing system, the alternate payment command based on the in-process call detail record monitored by the billing system during the course of the communication and causing the switching equipment to connect the originating station or the termination station to a service node configured for accepting alternate payment information.

25. The system of claim 21, further comprising:

a prepaid telephone service card distribution center coupled to the prepaid telephone service database for entering prepaid telephone service card information associated with a batch of telephone service cards into the prepaid telephone service database and distributing the batch of prepaid telephone service card among a plurality of retail distribution points.

* * * * *